United States Patent [19]

Yabe et al.

[11] Patent Number: 5,337,164
[45] Date of Patent: Aug. 9, 1994

[54] NEGATIVE FILM IMAGE READING DEVICE

[75] Inventors: Takashi Yabe; Hiroyuki Yamamoto, both of Hachioji, Japan

[73] Assignee: Konica Corporation, Tokyo, Japan

[21] Appl. No.: 8,950

[22] Filed: Jan. 26, 1993

[30] Foreign Application Priority Data

| Jan. 30, 1992 | [JP] | Japan | 4-040231 |
| Mar. 26, 1992 | [JP] | Japan | 4-100552 |
| Jun. 11, 1992 | [JP] | Japan | 4-179045 |

[51] Int. Cl.$^5$ .............. H04N 1/387; H04N 1/40; H04N 1/38; H04N 3/36
[52] U.S. Cl. .................. 358/487; 358/461; 358/464; 358/452; 358/453; 348/97; 382/9
[58] Field of Search .......... 358/487, 461, 464, 452, 358/453, 214, 475; 382/9

[56] References Cited

U.S. PATENT DOCUMENTS

| 4,760,464 | 7/1988 | Sakano | 358/461 |
| 4,922,335 | 5/1990 | Outa et al. | 358/475 |
| 5,072,311 | 12/1991 | Hiramatsu et al. | 358/487 |
| 5,185,668 | 2/1993 | Ohta | 358/214 |
| 5,231,515 | 7/1993 | Endo | 358/487 |
| 5,231,517 | 7/1993 | Taguchi | 358/453 |
| 5,268,773 | 12/1993 | Park et al. | 358/461 |
| 5,278,669 | 1/1994 | Takemoto | 358/453 |
| 5,278,919 | 1/1994 | Sugiura et al. | 358/453 |

Primary Examiner—Edward L. Coles, Sr.
Assistant Examiner—Kimberly A. Williams
Attorney, Agent, or Firm—Finnegan, Henderson, Farabow, Garrett & Dunner

[57] ABSTRACT

In an apparatus for reading a photographed image on a standard size negative film, wherein the photographed image includes a standard size image and a pseudo panoramic image, and wherein the pseudo panoramic image includes an exposed image region and an unexposed non-image region, the apparatus includes an image reader to photoelectrically read an image of a film and to ouput image signals, a circuit to process the image signals and to determine an image region and a non-image region on the image of the film, and the circuit eliminates image signals corresponding to the non-image region.

9 Claims, 26 Drawing Sheets

NEGATIVE FILM IMAGE READING DEVICE

BACKGROUND OF THE INVENTION

The present invention relates to an image reading device that reads information of an image photographed on a 35 mm standard negative film, and more particularly relates to an image reading device that reads information of an image photographed on a pseudo panoramic negative film.

Recently, pseudo panoramic photographing has been conducted on a 35 mm standard negative film, or both standard photographing and pseudo panoramic photographing have been conducted with a 35 mm standard negative film. Images on a negative film obtained by the pseudo panoramic photographing are printed, and also images on a standard negative film obtained by both the standard photographing and the pseudo panoramic photographing are printed. When images obtained by the pseudo panoramic photographing are printed, it is necessary to cover the portions of the film on which the pseudo panoramic photographing has not been conducted.

In order to cover the non-image portions of the film on which the pseudo panoramic photographing has not been conducted, it is necessary to read the pseudo panoramic photographed images on the film. However, the aforementioned type image reading device has not been provided yet. For example, the following image reading method can be easily devised. In the method, the same panoramic adapter as that used for pseudo panoramic photographing is used so as to cover the non-image portions of the film on which the pseudo panoramic photographing has not been conducted.

However, the standard of panoramic adapters has not been standardized yet, so that the dimensions and position of a panoramic adapter depend on the camera manufacturers. Even when the same panoramic adapter is used for the same camera, there is a possibility that the position of an image photographed on a film is shifted due to the influence of the optical system and the shift of the film. Therefore, it is difficult to completely remove the non-image portion by using a panoramic adapter.

In the case where an image on a pseudo panoramic photographed image is read while the pseudo panoramic photographing negative film is set on a 35 mm conventional standard mount, even the unexposed non-image portion is subjected to image reading processing, so that the read portion is outputted into black. Therefore, when the image is reproduced by a copier, black toner is wasted.

Even if the panoramic adapter is standardized, in the case where both pseudo panoramic images and standard images are photographed on the same film, the following troublesome operations are required for an operator: in the case of a pseudo panoramic image, the panoramic adapter is inserted, and in the case of a standard image the panoramic adapter is removed.

The present invention has been achieved to solve the aforementioned problems. The first object of the present invention is to provide an image reading device capable of removing unnecessary portions except for a portion in which the pseudo panoramic photographing has been conducted, without using a panoramic adapter.

In the case where printing is carried out using a pseudo panoramic photographing negative film, image information of the pseudo panoramic photographing negative film is read by an image reading device, and the obtained image information is subjected to image processing, and then the image information is outputted to a copier. Before the aforementioned image processing, shading correction is carried out. This shading correction is carried out in the following manner: a frame of the unexposed portion of the film or a corresponding filter is set in a film holder; and the film holder is inserted into a projector so that shading correction is conducted in accordance with the information of the unexposed portion.

According to the aforementioned method, it is necessary to prepare an unexposed frame, the type of which is the same as that of the photographed negative film. Therefore, the aforementioned method is not practical.

However, unexposed frames tend to fade when they are preserved, and further they are susceptible to damage. Therefore, when a shading operation is conducted with a faded unexposed film, the colors of the photographed negative film and those of the unexposed frame can not be balanced, so that color reproduction can not be accurately carried out.

Pseudo panoramic photographing negative film has come into wide use recently. However, image information is read and outputted by the same procedure as that of a conventional standard photographing negative film. For example, in the case where exposure control data is taken in, there is no control method suitable for a pseudo panoramic photographing negative film, so that the conventional exposure control method has been used for the pseudo panoramic photographing negative film until now.

The same method as that of a standard photographing negative film is applied to a pseudo panoramic photographing film. Therefore, although a non-image portion exists on the film, a frame of another unexposed negative film is used separately from the photographed film. Further, it is necessary to previously conduct a shading operation in addition to a reading operation.

In addition, when the exposure control data is taken in, almost all the image portions of the standard photographing film are used as data in order to improve the accuracy. In the case of a pseudo panoramic photographing negative film, the image portion is located only in the center of the frame. Therefore, the same image range as that of the standard negative film is taken in for the pseudo panoramic photographing negative film. For that reason, the density of the exposure control data becomes lower than that of an actual image. After all, it is judged that the density of the pseudo panoramic photographing negative film is lower than that of an actual image, so that the exposure amount for the pseudo panoramic photographing negative film is reduced. As a result, the obtained film is finished under exposure.

The present invention has been achieved to solve the aforementioned conventional problems. The second object of the present invention is to provide an image reading device by which excellent finished images can be obtain from a pseudo panoramic photographing negative film.

The conventional image information reading of a pseudo panoramic photographing negative film is carried out as follows: a shading operation is conducted before image processing; exposure control is conducted; and then a reading operation is conducted. Therefore, the image reading process is complicated and troublesome.

In the case where image information of a pseudo panoramic photographing negative film is read a plurality of times, the shading data is collected at each time, or the shading data is collected for the first time, and the same data is used after that. It is complicated to conduct the shading operation at each time as described above, and when the shading operation is conducted only once, it is impossible to maintain the image quality.

In view of the aforementioned point, it is an object of the present invention to provide an image forming device by which image information can be easily read from a pseudo panoramic photographing negative film.

The third object of present invention is to provide an image forming apparatus by which a predetermined image quality level can be maintained when a minimum shading correcting operation is conducted.

Problems will be described as follows that are caused when the aforementioned conventional image reading device is applied to a copier.

In order to directly print an image onto a photographic paper from a negative film, a high level of technique and special apparatus are required. Therefore, it is difficult for amateurs to print easily.

On the other hand, technique of a color copier has made a great advance recently, so that a color image recorded on a paper can be highly accurately copied.

As a result of the foregoing, the following color-copier has been proposed recently (for example, Japanese Patent Application Open to Public Inspection No. 46646/1991): An image recorded on a film of various kinds is projected by a projector. The projected image is photoelectrically read by an image reading device provided with a photoelectric transfer element such as a CCD sensor in a color copier so that an electrical image signal is obtained. In accordance with the obtained electrical image signal, a color-copying operation is carried out.

When an image recorded on a film is projected by a projector, the operations are carried out in the following manner: the film is mounted on the projector with a film carrier; the film is irradiated with light; the optical path of the transmission light is changed by a mirror unit; the film image is projected onto a Fresnel lens on the platen of the color copier; and the film image projected on the Fresnel lens is electrically read by an electrophotographic transfer element such as a CCD sensor of the color copier. The copy paper is selected and printing magnification is determined in accordance with the image that has been read in the aforementioned process.

An object of the conventional image reading device used for the aforementioned projector is designed to project an image recorded on a 35 mm film that is the most popular among amateurs.

As shown in FIG. 1, the aforementioned pseudo panoramic film to record a panoramic image on a 35 mm film is used in the following manner: the upper and lower portions of an ordinary frame, the size of which is 24 mm×36 mm, are shaded so that a horizontal image screen size (13 mm×36 mm) can be obtained.

As described above, the size of a projected image on a pseudo panoramic film is extremely long from side to side, that is the length of a longitudinal side is very different from that of a lateral side compared with a standard 35 mm film. Therefore, the fourth object of the present invention is to provide appropriately determine the paper size, printing magnification and printing position in accordance with a projected panoramic image.

SUMMARY OF THE INVENTION

In order to accomplish the aforementioned first object, the present invention is to provide an image reading device, comprising: an image reading means to read image information on a standard photographing negative film and a pseudo panoramic photographing negative film; and a removing means to remove an unnecessary portion from the image information sent from said image reading means, said unnecessary portion being defined as a portion except for a pseudo panoramic photographed portion.

The image reading device of the present invention comprises: an image reading means to read image information of a standard photographic image and a pseudo panoramic photographic image, both said standard photographic image and said pseudo panoramic photographic image existing on a negative film; a discriminating means to discriminate between standard photographing and pseudo panoramic photographing from the image information sent from the image reading means; and a removing means to remove an unnecessary portion from the discrimination results obtained by said discriminating means, said unnecessary portion being defined as a portion except for a pseudo panoramic photographed portion.

In the image reading device of the present invention, said removing means is characterized in that: the unnecessary portion except for a pseudo panoramic photographed portion is removed by region discrimination; and in the case where the region discrimination can not be carried out, the unnecessary portion except for a pseudo panoramic photographed portion is removed using a predetermined region.

In the present invention, image information of a standard photographing negative film and a pseudo panoramic photographing film is read, and an unnecessary portion except for a pseudo panoramic photographed portion is removed from this image information.

According to the present invention, image information of a standard photographing negative film and a pseudo panoramic photographing film is read, both said standard photographing negative film and said pseudo panoramic photographing film existing on the same negative film; standard photographing and pseudo panoramic photographing are discriminated from said image information; and an unnecessary portion except for the pseudo panoramic photographed portion is removed from the discrimination result.

According to the present invention, the unnecessary portion except for a pseudo panoramic photographed portion is removed by region discrimination, and in the case where the region discrimination can not be carried out, the unnecessary portion except for a pseudo panoramic photographed portion is removed using a predetermined region.

In order to accomplish the second object, the present invention is to provide an image reading device that reads and processes image information of a pseudo panoramic photographing negative film photographed using a standard negative film, comprising a shading correction means that conducts shading correction using a non-image portion except for the aforementioned pseudo panoramic photographed portion.

The present invention is to provide an image reading device that reads and processes image information of a pseudo panoramic photographing negative film photographed using a standard negative film, comprising an exposure control means to control exposure Using only the image portion photographed on said pseudo panoramic photographing film as exposure control data.

The present invention is to provide an image reading device that reads and processes image information of a pseudo panoramic photographing negative film photographed using a standard negative film, comprising a means to take shading correction data and exposure control data during prescanning before the image information of said pseudo panoramic photographing negative film is read.

In the case where image information of a pseudo panoramic photographing negative film is read and processed, shading correction is conducted using a non-image portion except for a portion photographed on a pseudo panoramic photographing negative film. As described above, it is not necessary to prepare a surplus frame on the unexposed film for shading, and shading can be carried out in the same frame of the photographed pseudo panoramic photographing negative film. Therefore, the photographic conditions are the same, so that color reproduction is very accurate in the developing process. Also, the shading correction is carried out in the same frame on the pseudo panoramic photographing negative film, the film preserving conditions are precisely the same. Accordingly, an accurate shading correction can be carried out compared with a case in which shading is carried out using an unexposed film.

In the case where image information of a pseudo panoramic photographing negative film is read and processed, the image portion photographed on the pseudo panoramic photographing negative film is used as exposure control data, and exposure is controlled. As described above, exposure control data is read from an image portion except for the non-image portion of the photographed pseudo panoramic photographing negative film. Therefore, exposure control is accurately conducted, and further a reversal operation from negative to positive can be precisely carried out.

In the case where the image information of a pseudo panoramic photographing negative film is subjected to image reading processing, shading correction data and exposure control data are taken in a prescanning process conducted before the image information of-the pseudo panoramic photographing negative film is subjected to image reading processing. Since the shading correction is conducted in one prescanning operation as described above, it is not necessary to conduct the shading correction independently. Therefore, the operator can read image data without giving consideration to the shading correction. Further, only the image portion in which exposure control data has been photographed, is read, so that exposure control can be accurately carried out, and furthermore negative-positive--reversal can be accurately carried out.

In order to accomplish the third object of the present invention, the image reading device of the invention in which image information on a pseudo panoramic photographing negative film photographed with a standard negative film is read and processed, comprises a means that conducts shading correction in the non-image portion on said pseudo panoramic photographing negative film, and then reads the image portion as it is.

The image reading device of the invention in which image information on a pseudo panoramic photographing negative film photographed with a standard negative film is read and processed, comprises a means characterized in that: in the case where said pseudo panoramic photographing negative film photographed is read a plurality of times, the reading operations of the second time and after that are conducted using the shading data of the first time.

The image reading device of the invention in which image information on a pseudo panoramic photographing negative film photographed with a standard negative film is read and processed, comprises a means characterized in that: when the same frame on said pseudo panoramic photographing negative film is read a plurality of times, the reading operations of the second time and after that are conducted using the shading data or exposure control data of the first time, or the reading operation after the second time is conducted using the shading data and exposure control data.

The image reading device of the invention in which image information on a pseudo panoramic photographing negative film photographed with a standard negative film is read and processed, comprises a means that collects the shading data once in a plurality of times in the case where said pseudo panoramic photographing negative film is read a plurality of times.

After shading correction has been conducted in the non-image portion of the pseudo panoramic photographing negative film, the image portion is read as it is. For example, in the case where the exposure conditions have already been known, it is not necessary to conduct exposure control, and shading and reading are conducted by one scanning operation.

In the case where the pseudo panoramic photographing negative film is read a plurality of times, the reading operations of the second time and after that are conducted using the shading data of the first time, so that the number of the shading operations that have been conducted a plurality of times can be reduced to one. Therefore, the reading operation can be simplified.

In the case where the same frame of the pseudo panoramic photographing negative film is read a plurality of times, the reading operations of the second time and after that are conducted using the shading data or exposure control data of the first time, or using the shading data and exposure control data. Since the same frame is read, the shading and exposing conditions are not changed. Therefore, the reading operations of the second time and after that can be simplified when the data of the first time is used.

When the pseudo panoramic-photographing film is read a plurality of times, the shading data is collected once in a plurality of times so that a minimum times of correcting operations are conducted in order to maintain a predetermined quality level.

The image reading device of the invention to accomplish the fourth object comprises: a detection means to detect an inserting direction of a film carrier used for inserting a film, on which a panoramic image is recorded, into the projector; and a paper determining means to determine a paper, on which the panoramic image is to be printed, in accordance with the film carrier inserting direction detected by said detection means.

The aforementioned image reading means comprises a print magnification determining means that determines the magnification of a printed image in accordance with the longitudinal length of the panoramic image projected by the projector, and also in accordance with the length of the side of a printing paper that is located in parallel with the longitudinal direction of the printed panoramic image.

The aforementioned image reading device comprises a print position control means that controls a print position of the panoramic image on the paper.

The aforementioned print position control means includes: a calculation means to calculate the number of panoramic images that can be printed on the paper in accordance with the size of the paper; and a print position designating means to designate the print position on the paper in the case where the number of images calculated by the calculation means is plural.

According to the aforementioned structure of the invention, for example, papers of A4 size are prepared, in the case where the inserting direction is in parallel with the longitudinal direction of the panoramic image, A4 papers, the lateral side of which is longer that the longitudinal side, are selected, and in the case where the inserting direction is in parallel with the lateral direction of the panoramic image, A4R papers, the longitudinal side of which is longer than the lateral side, are selected, so that the direction of papers is matched to the direction of the panoramic image.

Compared with a print paper, the lateral length of a panoramic image is extremely longer than the longitudinal length. Therefore, the panoramic image can be positively printed on a print paper, and also the panoramic image can be printed in a desired position on the printer paper.

In the case where a plurality of panoramic images are printed on a print paper, they can be printed so that any empty portion can not be made on the paper. Therefore, the print papers are not wasted.

DETAILED DESCRIPTION OF THE PREFERRED EMBODIMENT

A specific example of the present invention will be explained as follows with reference to the attached drawings.

Figure 1:
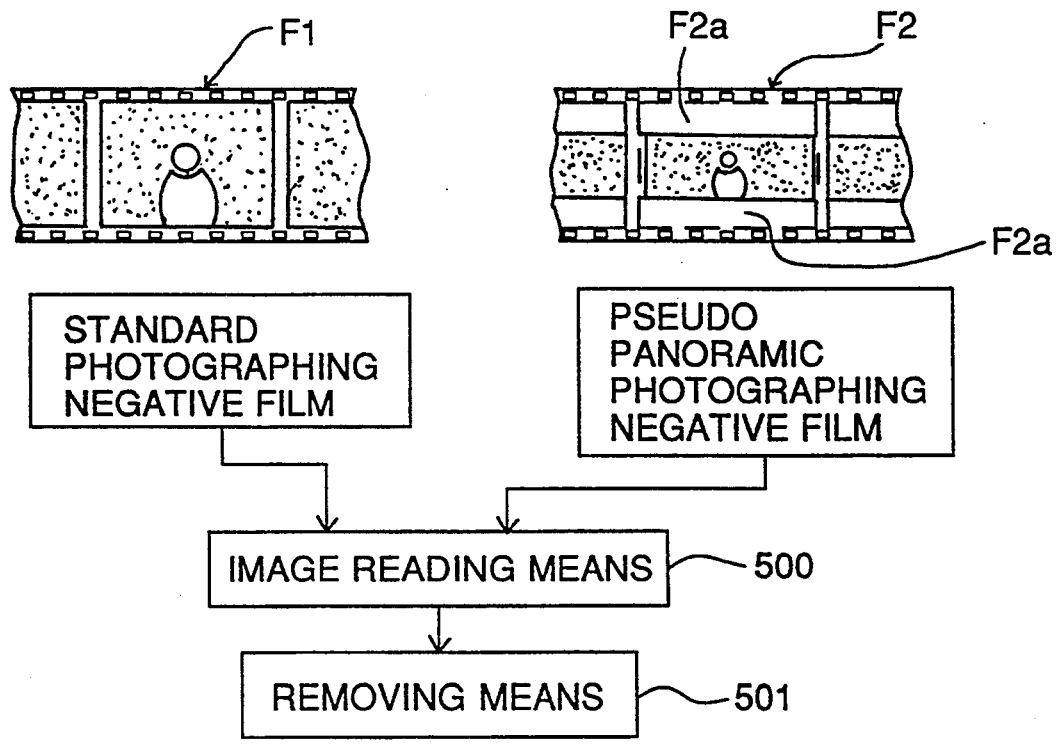
FIG. 1 is a schematic illustration showing the structure of the image reading device described in claim 1.

FIG. 1 is a schematic illustration of the image reading device of the present invention. This image reading device includes: an image reading means 500 that reads image information of standard photographing negative film F1 and pseudo panoramic photographing negative film F2; and a removing means 501 that removes unnecessary portion F2a of pseudo panoramic photographing negative film F2 according to the image information sent from the image reading means 500, wherein unnecessary portion F2a is a portion on pseudo panoramic photographic negative film F2 in which any images are not photographed. This removing means 501 discriminates unnecessary portion F2a of pseudo panoramic photographing negative film F2 by means of region discrimination and removes it. In the case where this region discrimination can not be carried out, unnecessary portion F2a on pseudo panoramic photographing negative film F2 in which no images are photographed, is removed using a predetermined region.

Since unnecessary portion F2a can be removed from pseudo panoramic photographing negative film F2, both standard photographing negative film F1 and pseudo panoramic photographing negative film F2 can be read using a standard photographing negative film carrier. When an image on this pseudo panoramic photographing negative film F2 is read in the same manner as that of an image on standard photographing negative film F1, a user can read negative film images without giving consideration to the photographing condition such as a pseudo panoramic photographing condition or a standard photographing condition.

Figure 2:
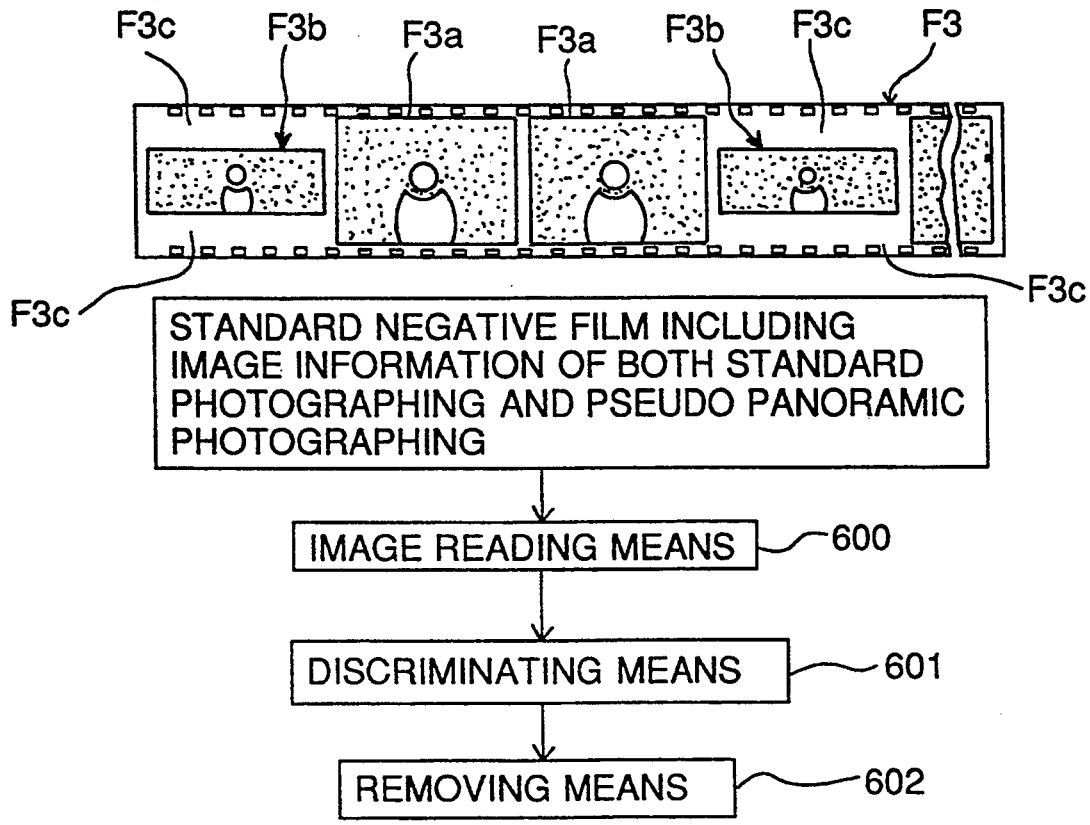
FIG. 2 is a schematic illustration showing the structure of the image reading device described in claim 2.

FIG. 2 is a schematic illustration showing the structure of the image reading device of the present invention. This image reading device includes: an image reading means 600 that reads the image information of standard photographing F3a photographed on standard negative film F3 and also reads the image information of pseudo panoramic photographing F3b; a discrimination means 601 that discriminates between the standard photographing and the pseudo panoramic photographing according to the image information sent from the image reading means 600; and a removing means 602 that removes unnecessary portion F3c except for a portion in which a pseudo panoramic image is photographed. This removing means 602 removes the unnecessary portion F3c in which a pseudo panoramic image is not photographed, by means of region discrimination. In the case where this region discrimination can not be carried out, unnecessary portion F3c on pseudo panoramic photographing negative film in which no images are photographed, is removed using a predetermined region.

As described above, unnecessary portion F3c can be removed that is except for a portion on which panoramic photographing has been conducted. Therefore, only when standard negative film F3 on which both standard photographing portion F3a and pseudo panoramic photographing portion F3b are provided, is set on a negative film carrier for standard photographing, photographing portion F3a and pseudo panoramic photographing portion F3b can be read. Accordingly, a user can read negative film images without giving consideration to the photographing condition such as a pseudo panoramic photographing F3b condition or a standard photographing F3a condition.

Next, a more specific example of this image reading device will be explained as follows.

1. Outline of the Image Reading Device

Figure 3:
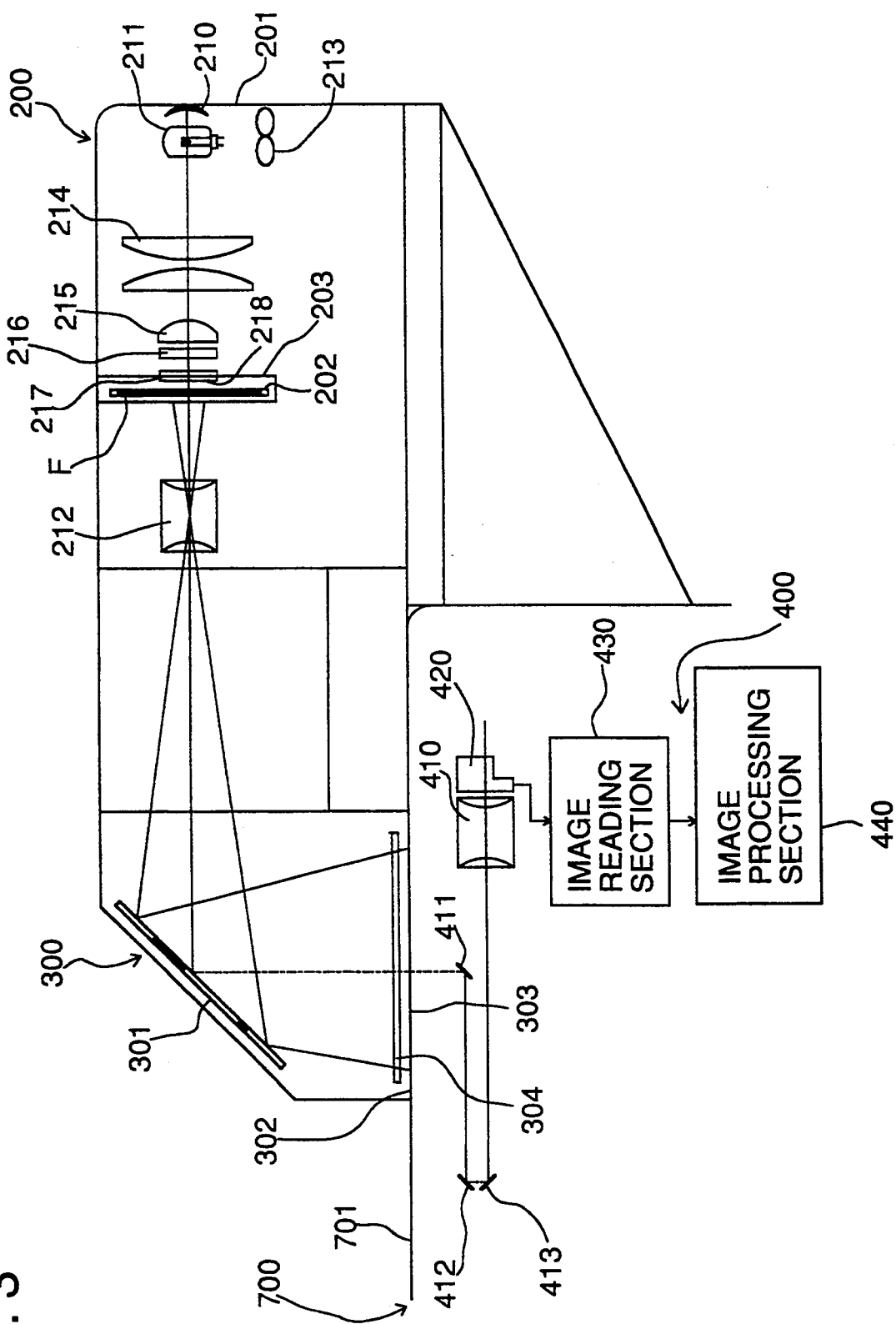
FIG. 3 is a schematic illustration showing the structure of an image reading device to which the present invention is applied.

FIG. 3 is a schematic illustration showing the structure of the image reading device to which the present invention is applied. As shown in FIG. 3, the image reading device includes a film projector 200, a mirror unit 300 and an image reading section 400 of a digital color copier. In this image reading device, a document image is read in such a manner that a ray of light is transmitted through the document.

Structure of the Film Projector 200

This film projector 200 includes grooves 203 provided on the upper and side surfaces of the film projector body 201 so that a film carrier 202 supporting document film F can be longitudinally or laterally inserted into the projector body 201. For this film carrier 202, both a carrier for 35 mm negative film use and a carrier for reversal film use are prepared. Therefore, these films can be provided to the film projector body 201 through the aforementioned carriers.

In the film projector body 201, a light source lamp composed of a reflector 210 and a halogen lamp 211 is disposed coaxially with a projection lens 212. A cooling fan 213 to cool the halogen lamp 211 is provided close to the halogen lamp 211. Further, on the left of the halogen lamp 211, a condenser lens 214 to converge a ray of light sent from the halogen lamp 211, a convex lens 215 and a heat absorbing filter 216 to cut a ray of light of a predetermined wavelength, are respectively disposed coaxially with the projection lens 212.

A correction filter 217 to correct the spectral characteristics of a film and also to correct the spectral characteristics of the lamp is provided on the left of the heat absorbing filter 216, and also a diffusion plate 218 to hide the filament of the light source lamp is provided.

The electrical power source of this film projector 200 is provided separately from that of the base machine 700.

Structure of the Mirror Unit 300

In the mirror unit 300, total reflection mirror 301 is supported by the film projector body 201 so that an angle formed by the all reflection mirror 301 and the bottom portion 302 can be 45°. An opening 303 is formed in the bottom portion 302, and a Fresnel lens 304 is provided in the opening 303. The Fresnel lens 304 changes the ray of light reflected by the total reflection mirror 301, which is going to diffuse, into a parallel ray of light, so that the spherical portion of the image can be brightened.

In the case where a color copying operation is not carried out, the mirror unit 300 is accommodated in the film projector body 201. Then, the mirror unit 300 is placed in a predetermined position on a platen glass 701 of the base machine to be used.

Structure of the image reading section 400

The image reading section 400 includes mirrors 411, 412, 413, condenser lens 410, CCD 420 that is a photoelectric conversion element, image reading section 430 and image processing section 440. A reading operation is carried out according to the following reading mode.

Reading Mode

The reading mode comprises two modes, one is a negative film mode, and the other is a reversal film mode. These mode can be selected by a selection key (not shown) provided on the image reading device body.

Flow of Reading Operations

Figure 4:
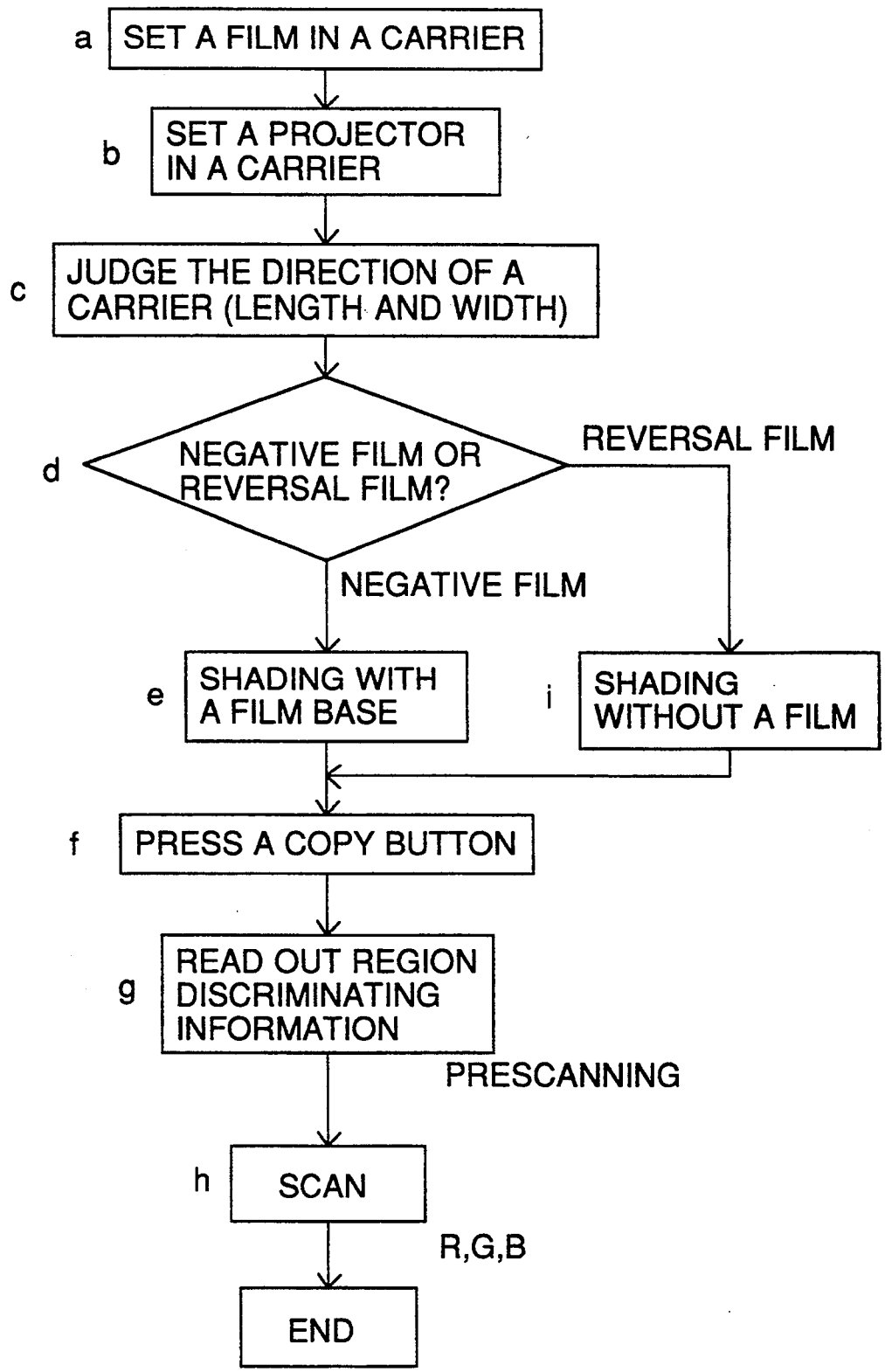
FIG. 4 is a fundamental flow chart showing the operation of film reading.

FIG. 4 is a flow chart of fundamental film reading operations. First, a film is set on the carrier (step a). This carrier is set at the projector (step b), and it is judged whether the carrier is set longitudinally or laterally (step c). In step d, it is judged whether the film is a negative film or a reversal one. In the case of a negative film, a shading operation is conducted on the film base (step e). In the case of a reversal film, a shading operation is conducted without the film base (step i). Then, the copy button is pressed (step f), and a prescanning operation is carried out so that region discrimination is conducted on the image on the negative film and image information is read (step g). Then, the scanning operations of red (R), green (G) and blue (B) are carried out. In the manner described above, the image photographed on the negative film can be read.

II Method for Determining an Effective Image Region of Pseudo Panoramic Film

II-0 Structure of the Entire Image Reading Device

Figure 5:
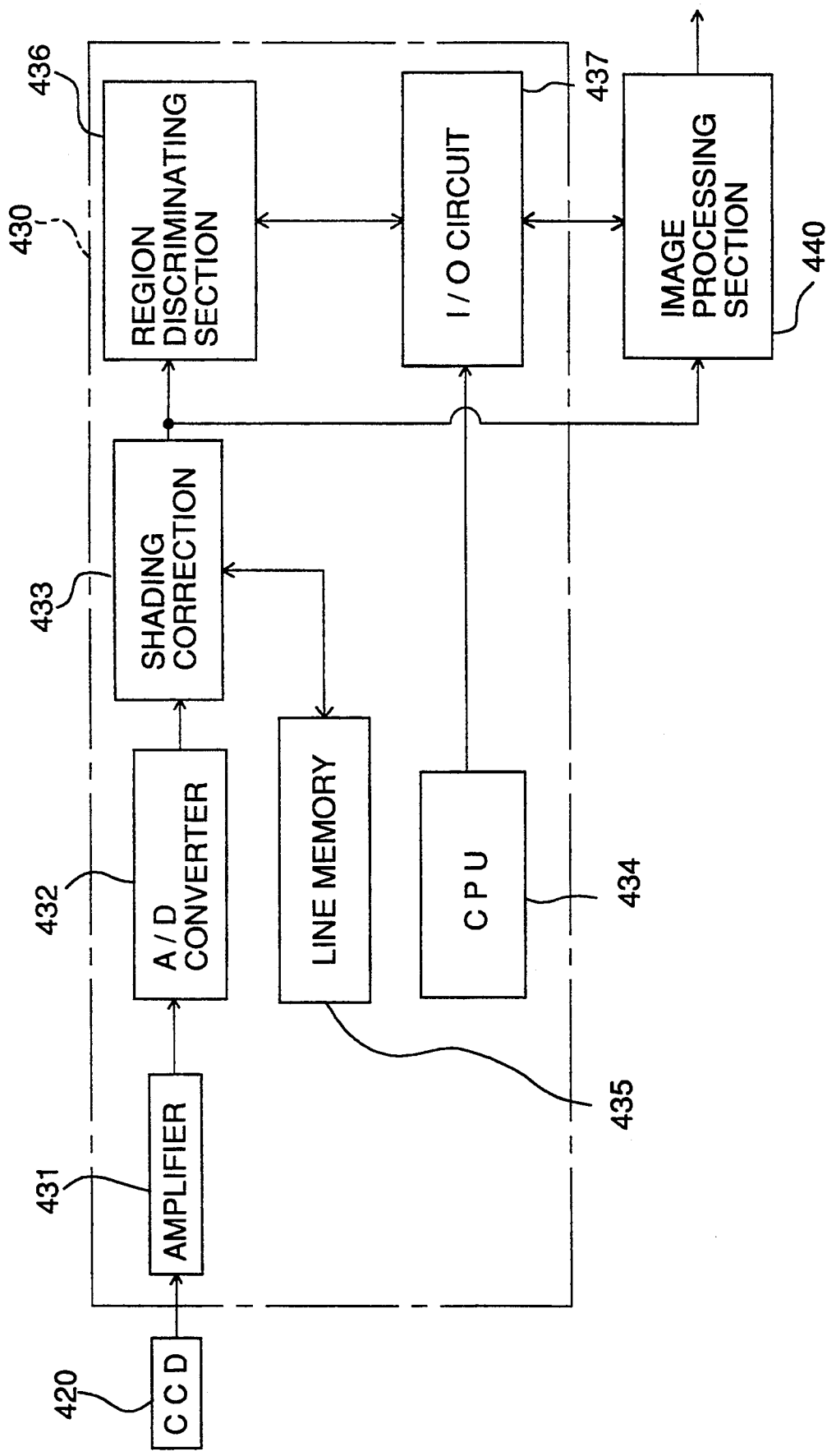
FIG. 5 is a schematic illustration showing the circuit of an image reading device.

FIG. 5 is a schematic illustration showing the structure of the image reading device. As shown in FIG. 5, an image signal is read by the CCD 420 of the photoelectric conversion element of the line sensor. The read image signal is amplified by the amplifier 431, and the amplified image signal is converted into a digital signal by the A/D converter 432. This digital signal is corrected by the shading correcting section 433 and stored in the line memory 435 controlled by the CPU 434. According to the image signal that has been corrected by the shading correcting section 433, pixel discrimination is conducted in the region discriminating section 436 in order to discriminate whether it is an image portion or a non-image portion. In this way, the effective image region is determined. The effective image region signal of the region discriminating section 436 is sent to the image processing section 440 through the I/O circuit 437. Not only the effective image region signal of the region discriminating section 436 but also an image signal of the shading correcting section 433 is sent to this image processing section 440 so that both signals are processed.

II-I Pixel Discrimination (Discrimination between an image portion and a non-image portion)

Figure 6:
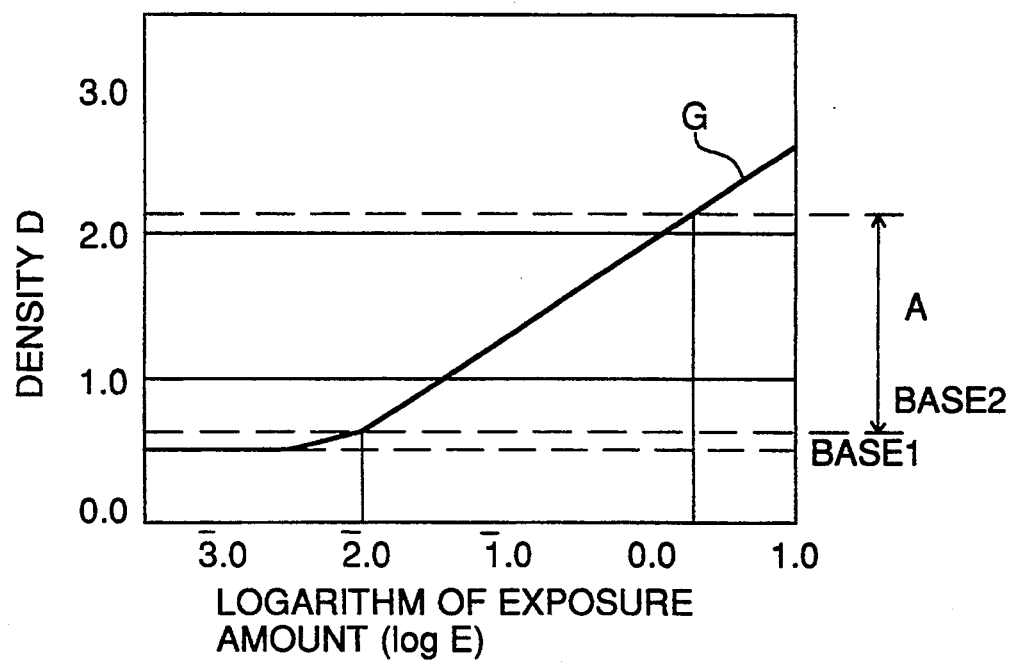
FIG. 6 is a graph showing a relation between the exposure amount and the density in the case of green of a color negative film, wherein the exposure amount is represented by logarithm.

FIG. 6 is a graph showing a relation between the exposure amount and the density in the case of green of a color negative film, wherein the exposure amount is represented by logarithm. In FIG. 6, character A represents a range of density in which a photographed image is substantially recorded on a film. The minimum density in FIG. 6 is the fogging density (Base 1) of the film base. As shown in FIG. 6, a difference is made between the minimum density (Base 1) and the minimum density (Base 2) of the density range A recorded on the film. When a threshold value is set in this difference, the image and non-image portions can be discriminated and separated, and the data can be binarized.

Figure 7:
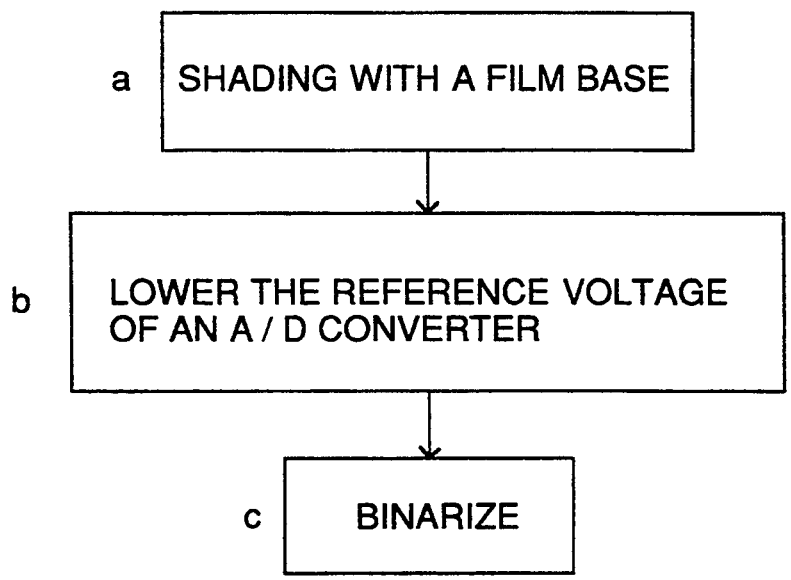
FIG. 7 is a flow chart that discriminates between an image portion and a non-image portion.
Figure 8:
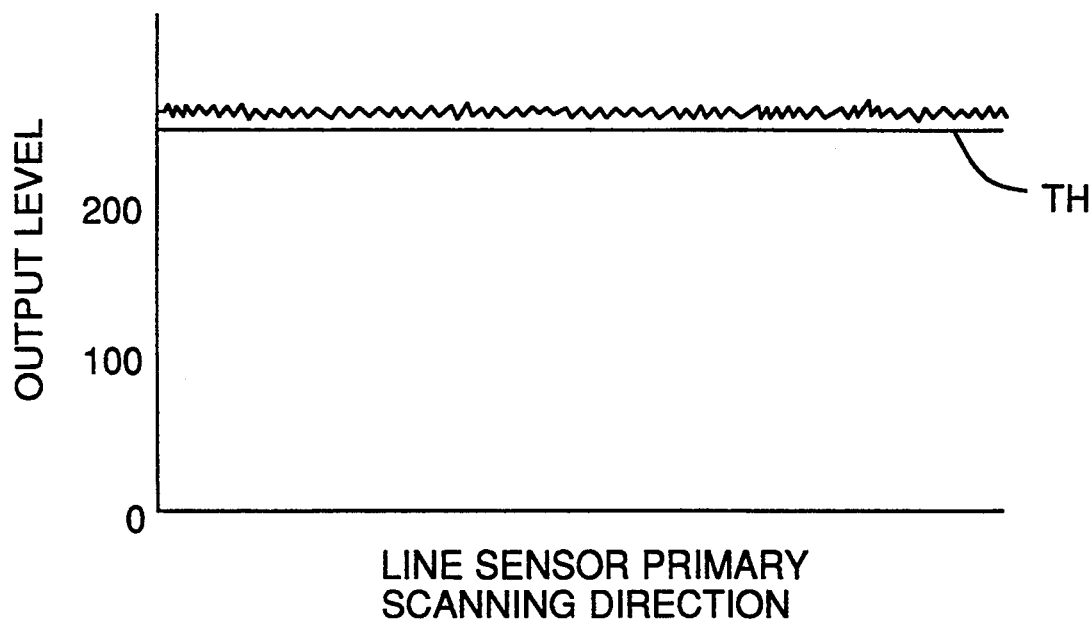
FIG. 8 is a graph showing an outputting condition in the primary scanning direction of a line sensor.
Figure 9:
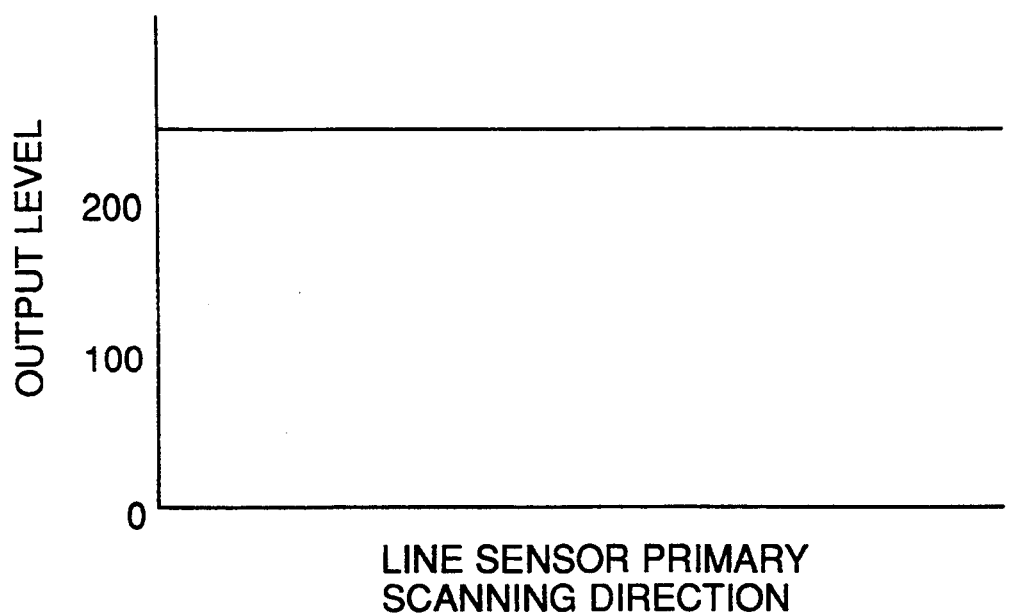
FIG. 9 is a graph showing an outputting condition in the primary scanning direction of a line sensor.

From the viewpoint of the aforementioned concept, the image and non-image portions are discriminated in accordance with the flow chart shown in FIG. 7. Next, the flow shown in FIG. 7 will be explained as follows. Shading correction is conducted on the film base that is an unexposed portion (step a). The shading correction is conducted here for the purpose of correcting nonuniformity of the irradiating light distribution in the projecting optical system, and also for the purpose of correcting the fluctuation of sensitivity of the photoelectric conversion element of the line sensor. In addition, the shading correction is conducted here for the purpose of setting the reference level of the film base. However, in the case where the signal is read on the film base under the aforementioned condition, the result is not good as shown in FIG. 8. Therefore, the comparative voltage in the A/D-converter is slightly lowered (step b). As shown in FIG. 9, the output of the film base is made to be 225 (the maximum value of the quantization level) wherever possible, so that the separation accuracy to separate the image portion from the non-image portion can be improved.

Figure 10:
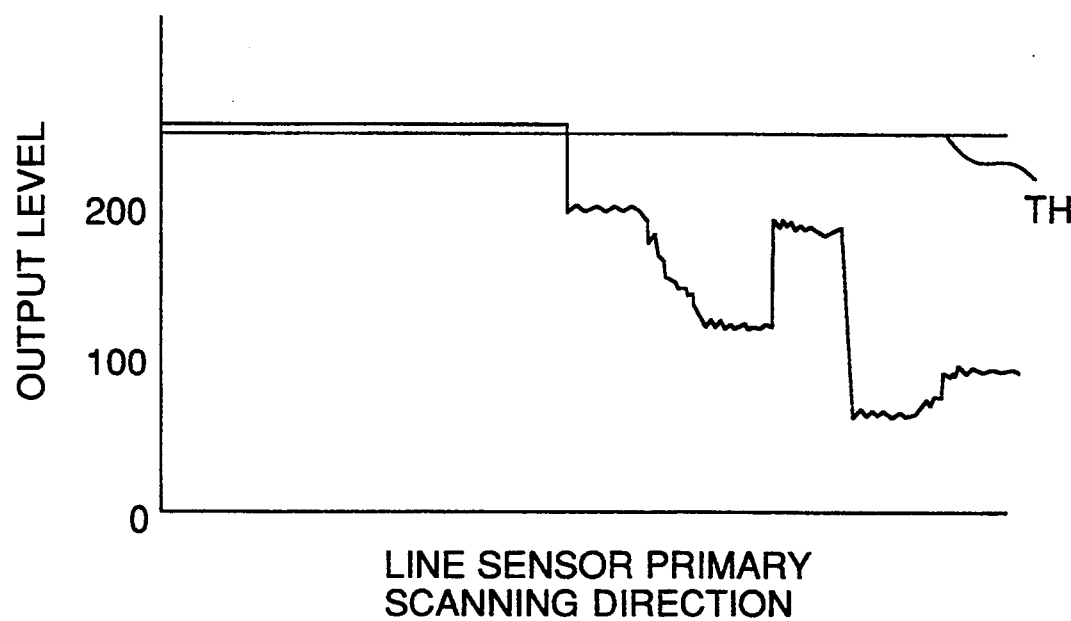
FIG. 10 is a graph showing an outputting condition in the primary scanning direction of a binarized line sensor.
Figure 11:
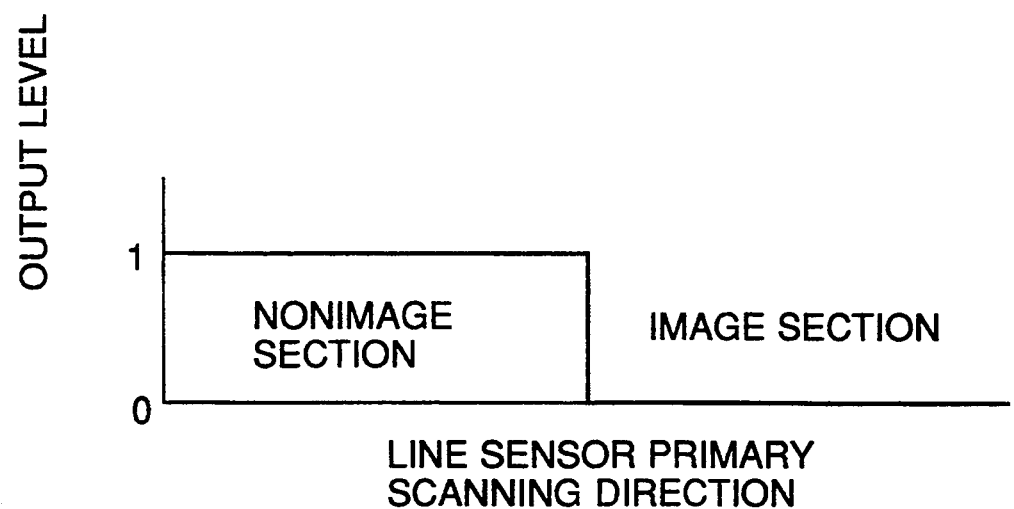
FIG. 11 is a graph showing an outputting condition in the primary scanning direction of a binarized line sensor.

For example, when threshold value TH is set at 250, the image signal that has been read by the CCD of the photoelectric conversion element of the line sensor, is binarized at each pixel in the following manner: values not less than 250 are defined as 1 (non-image portion), and values smaller than 250 are-defined as 0 (image portion) (step c). For example, an image illustrated in FIG. 10 is discriminated, and the image and non-image portions are separated from each other at each pixel as shown in FIG. 11.

Figure 12:
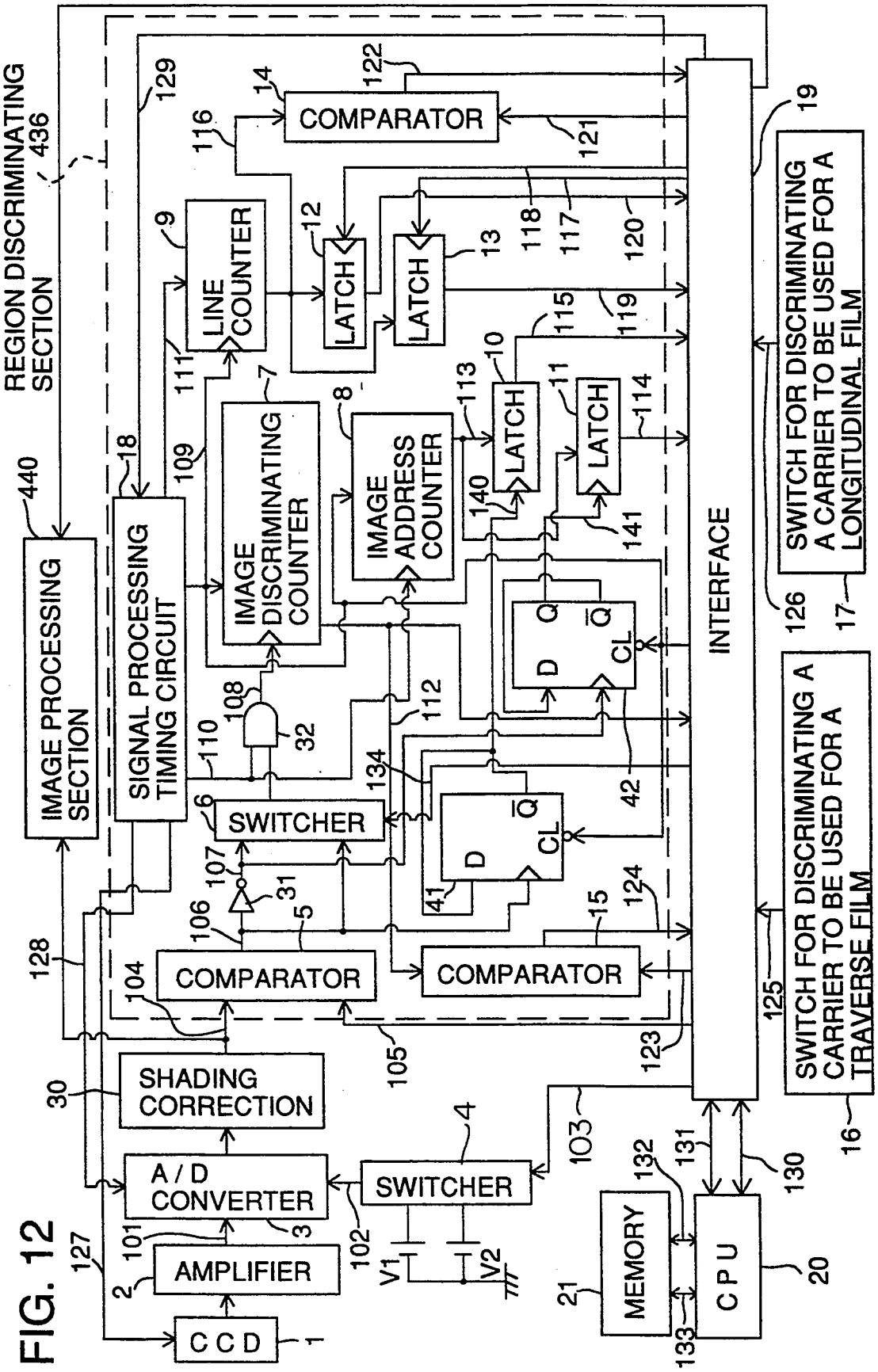
FIG. 12 is a circuit diagram of an image reading device.

Next, with reference to the circuit diagram of the image reading device shown in FIG. 12, a substantial signal flow will be explained as follows. Information is transmitted and received between the CPU 20 and the memory 21 of the image forming device through the data bus 132 and the address bus 133. Information is transmitted and received between the CPU 20 and the interface 19 through the data bus 130 and the address bus 131. The output 125 of the lateral film carrier judging switch 16 is inputted into this interface 19. The output 126 of the longitudinal film carrier judging switch 17 is also inputted into the interface 19. The CPU 20 controls the flow of the circuit in accordance with the judging switch output 125 and the judging switch output 126.

The auxiliary scanning image region tip signal 129 is inputted from the interface 19 into the signal processing timing circuit 18. The CCD drive pulse 127 is outputted from the signal processing timing circuit 18 into the CCD 1, and the A/D converter conversion clock 128 is outputted into the A/D converter 3. The primary scanning image effective signal 109 is outputted from this signal processing timing circuit 18 to the image discrimination counter 7, the image address counter 8 and the line counter 9. Also, the image signal clock 110 is outputted into the image address counter 8 and the AND circuit 32, and further the auxiliary scanning image effective signal 111 is outputted into the line counter 9.

Accordingly, the negative film image is converted into a reading image signal by the CCD 1, and amplified by the amplifier 2 so that the signal is converted into the analog image signal 101. While this converted analog image signal 101 refers to the A/D converter full scale voltage 102 sent from the switches 4, the converted analog image signal 101 is converted into the digital image signal 104 by the A/D converter 3. Concerning the A/D converter full scale voltage 102 sent from the switches 4, V1 is selected by the A/D converter full scale voltage selection signal 103 controlled by the CPU 20 in the case of shading data collection and normal image reading. In the case where the image and non-image portions are discriminated in the image region discrimination, V2 that is slightly lower than V1 is selected by the A/D converter full scale voltage selection signal controlled by the CPU 20. When V2 is selected, the accuracy of discrimination between the image and non-image portions can be improved.

Then, the digital image signal 104 passes through the shading correcting section 30, and corrects the nonuniformity of the distribution of irradiating light and also corrects the fluctuation of sensitivity of the CCD of the electrophotographic conversion element of the line sensor. After the shading correction conducted in the shading correcting section 30, the digital image signal 104 is sent to the comparator 5. Then, the digital image signal 104 is compared with the image/non-image portion discriminating signal 105 sent from the CPU 20, for example, the digital image signal 104 is compared with the signal level valve 250, and the values of the image signal not less than 250 are defined as 1, and the values of the image signal smaller than 250 are defined as 0 so as to be binarized. Therefore, the image portion becomes 0, and the non-image portion becomes 1. In the manner described above, the image and non-image portions are discriminated.

II-3 Method for Determining an Effective Image Region

Next, an image region described as follows is determined to be an effective image region: it is an image region that, has been photographed in accordance with the data discriminated between the image and non-image portions at each pixel in the pixel discrimination described in item II-1 (it is a discriminating operation to discriminate between the image and non-image portions).

Figure 13:
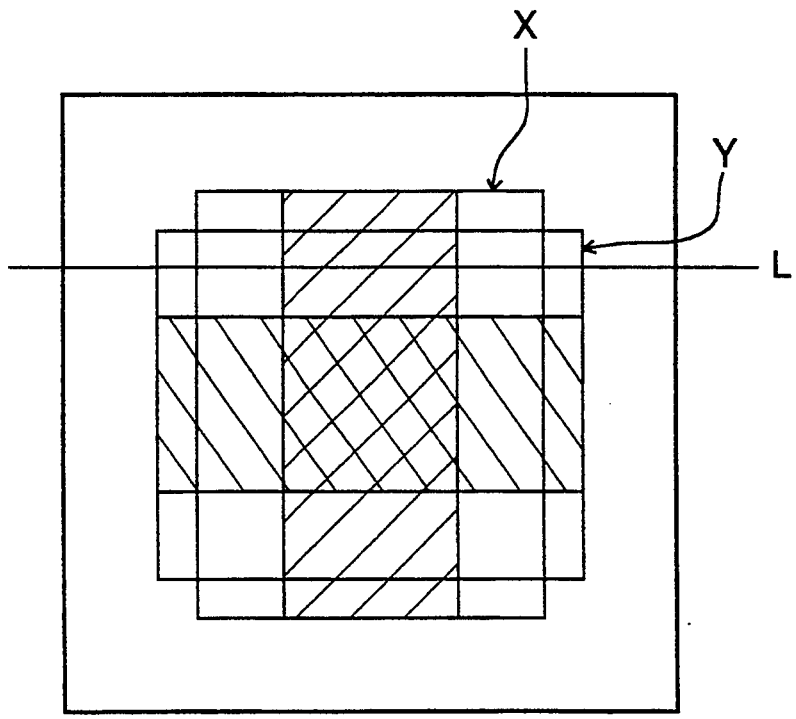
FIG. 13 is a view showing projected images of standard photographing and pseudo panoramic photographing.

Negative films are photographed under the condition that they are placed longitudinally, and alternatively, negative films are photographed under the condition that they are placed laterally. Therefore, the structure of an image photographed on a negative film is different according to "longitudinal X" and "lateral Y" as shown in FIG. 13. Therefore, whether the film carrier is set longitudinally or laterally is Judged by a sensor of the projector, and the processing of an effective image region is varied according to "longitudinal X" and "lateral Y".

II-3-1 Lateral Type

Figure 14:
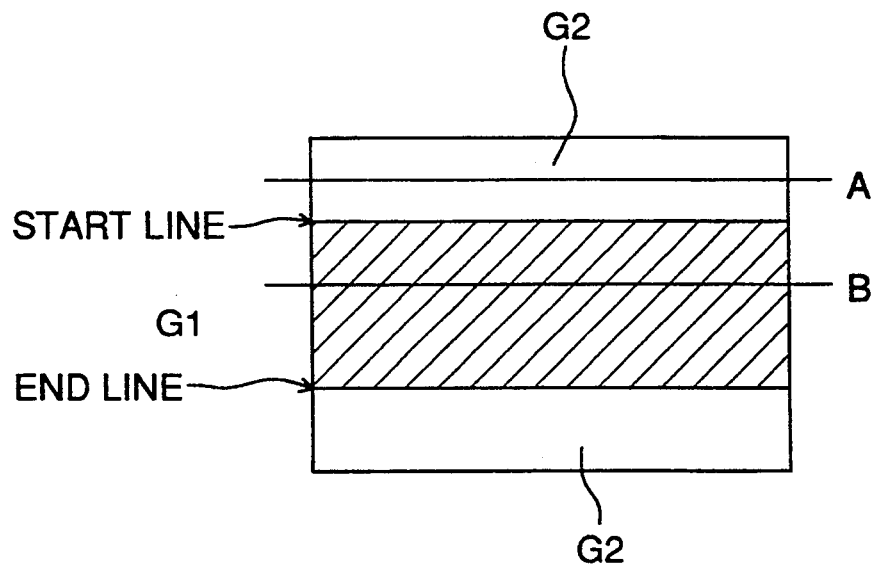
FIG. 14 is a view showing one frame of lateral type pseudo panoramic negative film.
Figure 15:
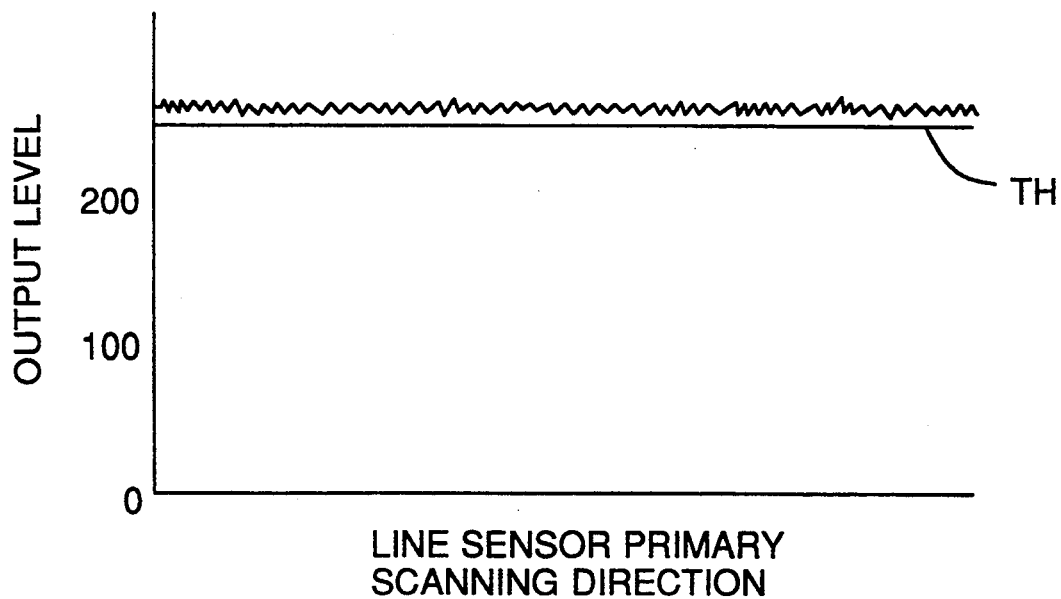
FIG. 15 is a graph showing an outputting condition in the primary scanning direction of the line sensor in the non-image portion of a lateral type pseudo panoramic negative film.
Figure 16:
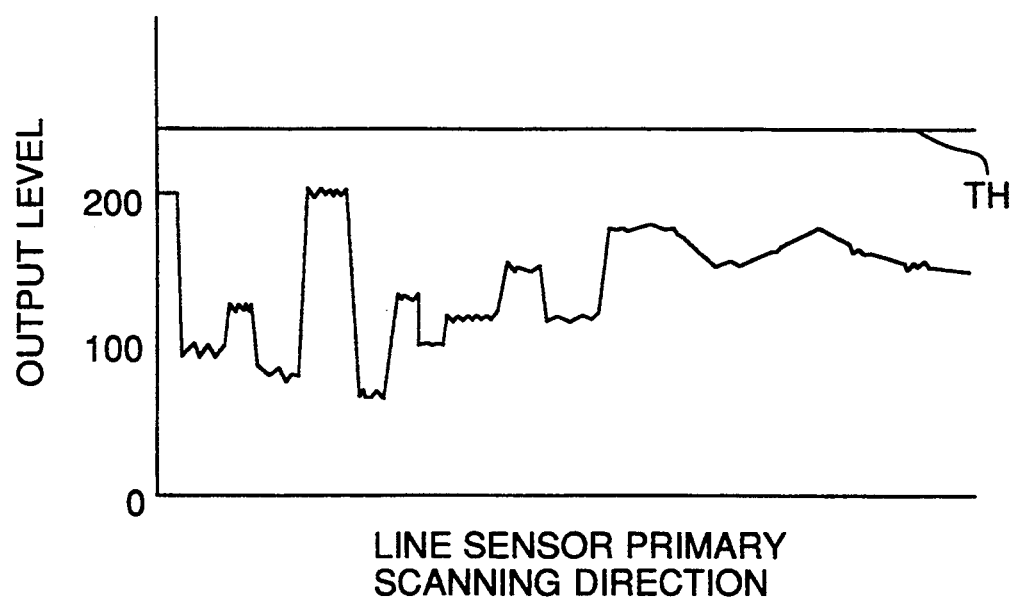
FIG. 16 is a graph showing an outputting condition in the primary scanning direction of the line sensor in the image portion of a lateral type pseudo panoramic negative film.
Figure 17:
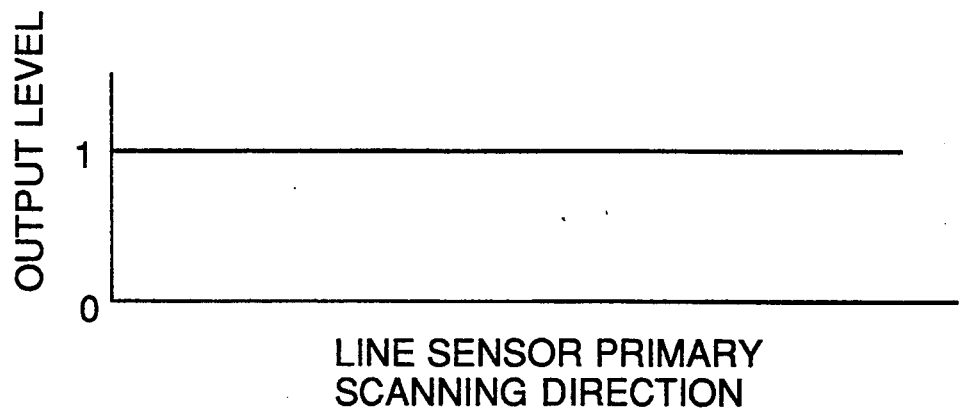
FIG. 17 is a graph showing an outputting condition that has been binarized in the primary scanning direction of the non-image portion.
Figure 18:
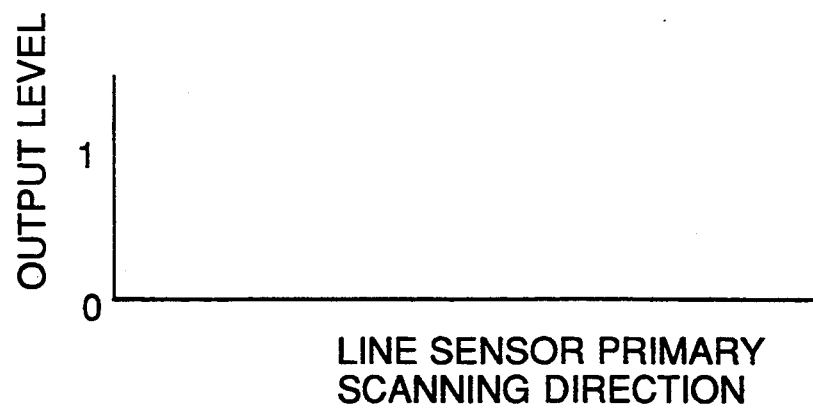
FIG. 18 is a graph showing an outputting condition that has been binarized in the primary scanning direction of the image portion.

One frame of a lateral type pseudo panoramic negative film is shown in FIG. 14. The hatched portion of this pseudo panoramic negative film is an image portion G1, and a portion except for the hatched portion is a non-image portion G2. FIG. 15 shows a profile in the primary scanning direction of non-image portion G2 of portion A in FIG. 14. FIG. 16 shows a profile in the primary scanning direction of image portion G1 of portion B in FIG. 14. These are binarized using a predetermined threshold Valve TH in the same manner as conducted in the pixel discrimination of item II-1. FIG. 17 shows the result in the case of the primary scanning direction of non-image portion G2 of portion A in FIG. 14. FIG. 18 shows the result in the case of the primary scanning direction of image portion G1 of portion B in FIG. 14. In the image data of one primary scanning line on the non-image portion, the number of pixels whose output level is 1 is N, which is the number of pixels of one primary scanning line. On the other hand, the number of pixels is approximately 0 in the image portion. Using the aforementioned relation, the effective image region in one frame of a lateral type pseudo panoramic negative film is determined.

Next, with reference to FIG. 12 that is a circuit diagram of an image reading device, a substantial signal flow will be explained as follows.

According to the signal 134 from the CPU 20 to determine the lateral starting-position or the lateral end position, the signal 106 representing the discrimination result between the image portion (0) and non-image portion (1) that are pixel-discriminated in the aforementioned item II-1, is selected by the switches 6 between the following two cases: one is a case in which the signal 106 of the discrimination result between the image portion (0) and the non-image portion (1) is taken; and the other is a case in which the reversal signal 107 obtained when the signal 106 is inverted by the inverter 31, is taken.

First, the starting position of the effective image region is determined. According to the lateral starting position signal 134 sent from the CPU 20, the signal 106 representing the discrimination result between the image portion (0) and the non-image portion (1) is selected by the switches 6. In this case, a signal sent to the image discrimination counter 7 is 0 in the image portion, and 1 in the non-image portion, and the counter clock 108 for counting pixels is counted by the image discrimination counter 7. This image discrimination counter 7 is reset at each line, so that the number of pixels of the non-image portion (1) is counted at each line. The number of lines is counted by the line counter 9 at each line. The comparator 15 compares the image region discriminating threshold value (for example, 0) 123 sent from the CPU 20, through the interface 19, with the output 112 of the pixel number counting value of the non-image portion sent from the image discriminating counter 7, and the film lateral position image region discriminating result 124 is sent to the CPU 20 through the interface 19. The comparator 15 compares the image region discriminating threshold value (for example, 0) 123 with the number obtained by the image discrimination counter 7. The number obtained by the line counter 9 that becomes the image region discriminating threshold value (for example, 0) 123 for the first time, that is, the start line of the effective image region is accommodated in the latch 13, and at the same time the lateral end position signal 134 is sent to the switches 6 from the CPU 20. The.-accommodating operation of the latch 13 is carried out in the following manner: the image portion tip line address value 119 at the film lateral position is held in the memory 21 by the image portion tip line holding signal 117 at the film lateral position sent from the interface 19.

Next, when the lateral end position determining signal 134 is sent to the switches 6 from the CPU 20, the end position of the effective image region is determined. In this case, the reversal signal 107 of the discrimination result signal 106 to discriminate between the image and non-image portions is selected, and the image portion becomes 1 and the non-image portion becomes 0. That is, the image discrimination counter 7 is reset at each line, and the number of pixels of the image portion is counted at each line. In the same manner as the starting position determination, the comparator 15 compares the image region discrimination threshold value (for example, 0) 123 sent from the CPU 20, with the number obtained by the image discrimination counter 7. The number obtained by the line counter 9 that becomes the image region discriminating threshold value (for example, 0) 123 for the first time, that is, the end line of the effective image region is accommodated in the latch 12. The accommodating operation of the latch 12 is carried out in the following manner: the image portion tail line address value 120 at the film lateral position is held in the memory 21 by the image portion tail line holding signal 118 at the film lateral position sent from the interface 19.

II-3-2 Longitudinal Type

Figure 19:
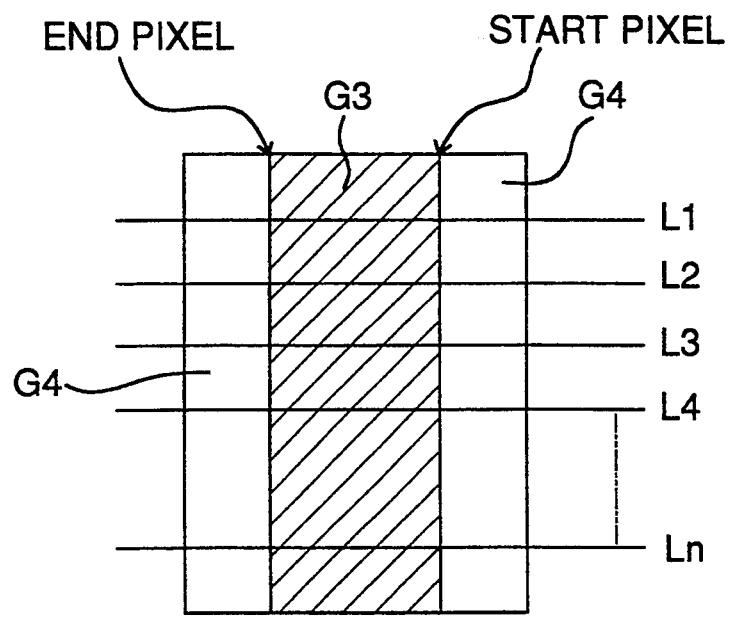
FIG. 19 is a view showing one frame of a longitudinal type pseudo panoramic negative film.
Figure 20:
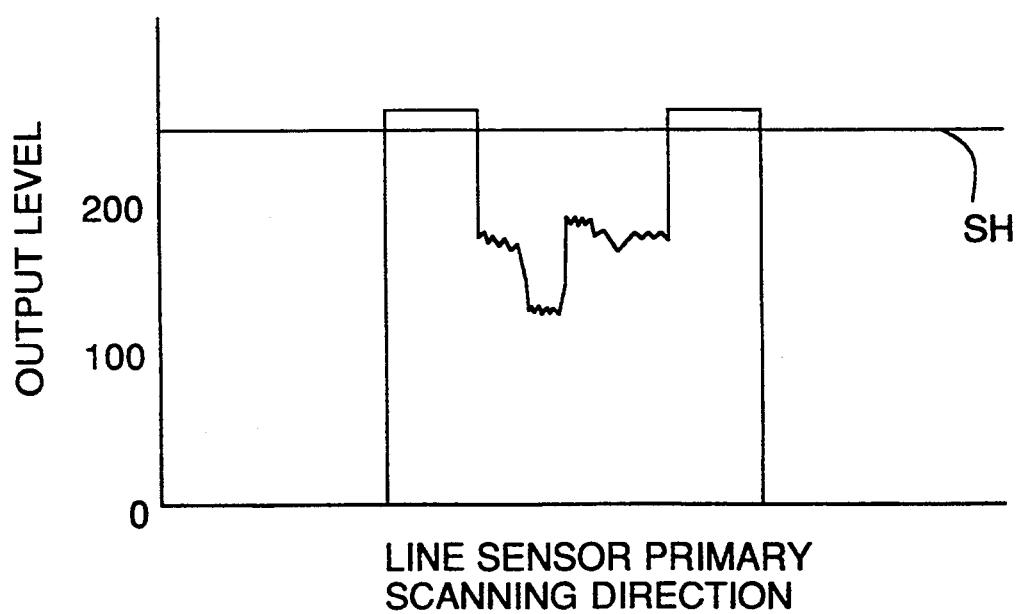
FIG. 20 is a graph showing an outputting condition in the primary scanning direction of the line sensor of longitudinal type pseudo panoramic negative film.
Figure 21:
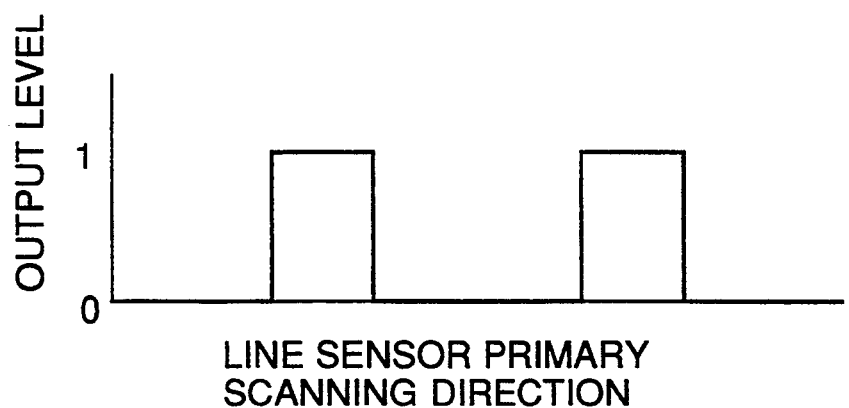
FIG. 21 is a graph showing an outputting condition in the primary scanning direction of a binarized line sensor.
Figure 22:
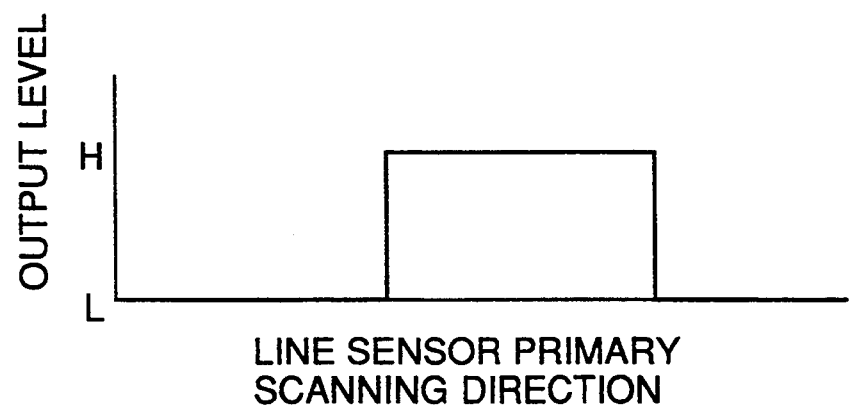
FIG. 22 is a view showing an outputting condition of D-type flip flop 42.
Figure 23:
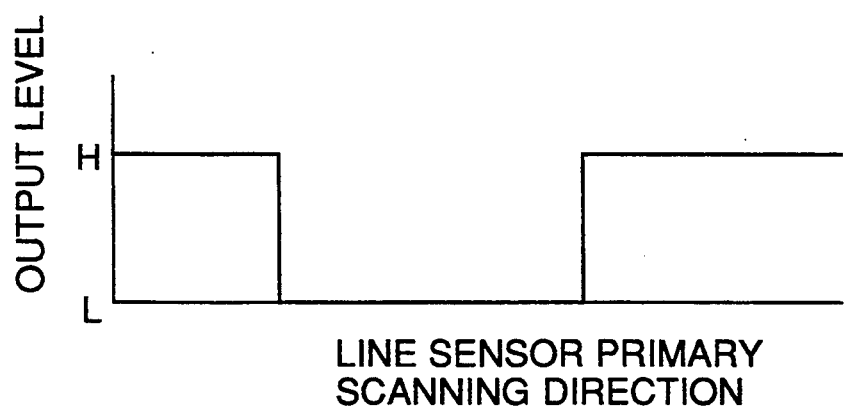
FIG. 23 is a view showing an outputting condition of D-type flip flop 41.
Figure 24:
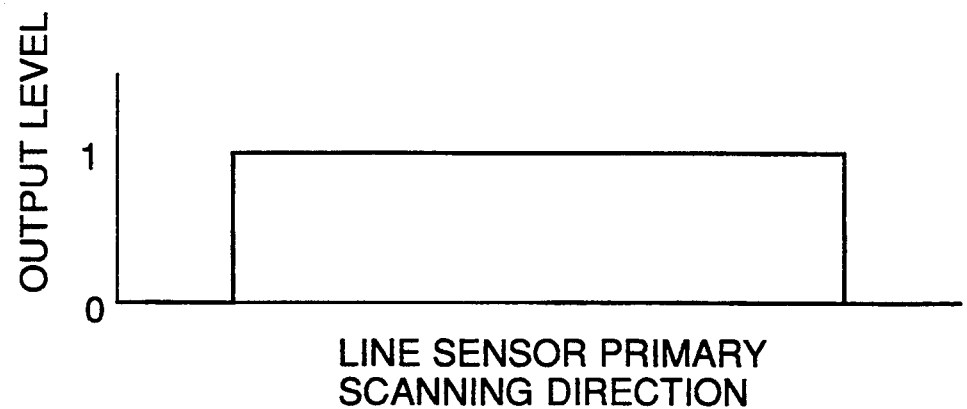
FIG. 24 is a view showing a binarized outputting condition in the primary scanning direction of the non-image portion of a lateral type pseudo panoramic negative film.
Figure 25:
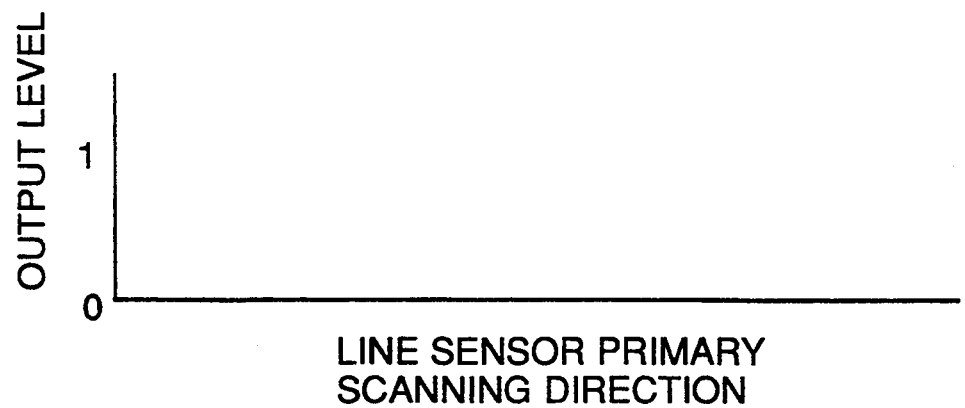
FIG. 25 is a view showing a binarized outputting condition in the primary scanning direction of the image portion of a lateral type standard negative film.
Figure 26:
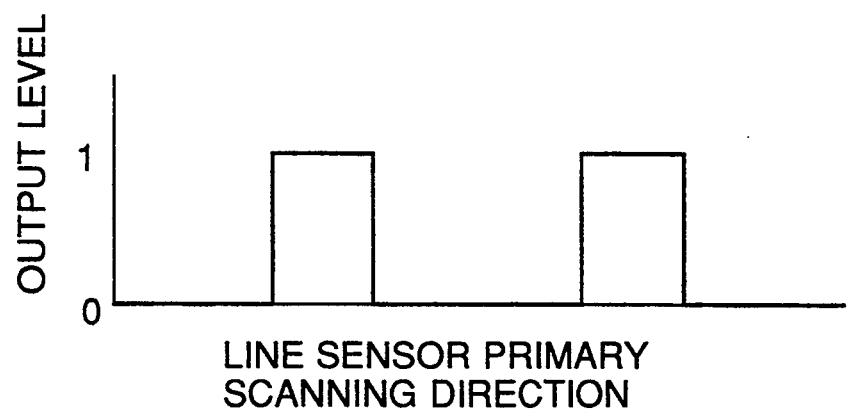
FIG. 26 is a view showing a binarized outputting condition in the primary scanning direction of the image portion of a longitudinal type pseudo panoramic negative film.
Figure 27:
FIG. 27 is a view showing a binarized outputting condition in the primary scanning direction of the image portion of a longitudinal type standard negative film.

One frame of a longitudinal type pseudo panoramic negative film is shown in FIG. 19. The hatched portion of this pseudo panoramic negative film is an image portion G3, and a portion except for the hatched portion is a non-image portion G4. FIG. 20 shows a profile in the primary scanning directions L1 to Ln of FIG. 19. When these are binarized by the predetermined threshold value (for example, 250) TH, the result is shown in FIG. 21 in which the output condition in the line sensor primary scanning direction is illustrated. Next, in order to make the judgment easy, a D type of flip flop 42 is used, and the waveforms shown in FIGS. 20 to 23 are generated. The following can be known from FIG. 22 in which the condition of the output 141 of the D type flip flop 42 is shown: the effective image region is started from the pixel at which Q output of D type flip flop 42, as shown in FIG. 12, is changed from L level to H level. The following can be known from FIG. 23 in which the condition of the output 140 of the D type flip flop 41 is shown: the end of the effective image region is the pixel at which $\overline{Q}$ output is converted from L into H.

There is a possibility that a negative film is not appropriately set at the film carrier. Therefore, as shown in FIG. 19, a predetermined interval is ensured between the lines, and the start and end points corresponding to n (for example, 10) lines are found, so that the accuracy of effective image region detection is improved. As described above, the start and end points of the effective image region corresponding to n lines, and the value of the previous lines and that of the present line are compared with each other, and the region is set a little inside so that the entire image can be set in the region. Therefore, the calculation is carried out (n−1) times so that a large value can be made to be a start point and a small value can be made to be an end point.

Next, with reference to FIG. 12 that is a circuit diagram of the image reading device, a substantial signal flow will be explained as follows.

The number of lines is counted by the line counter 9 at each line. When the number of counted lines has reached a predetermined number N, the start and end pixels of the effective image region are determined. The number of pixels is counted by the pixel address counter 8, and reset at each line by the primary scanning image effective signal 109. First, in the case of the start pixel of the effective image region, the operation is conducted as follows. The signal 107 obtained when the discrimination result signal 106 of the image portion (0) and the non-image portion (1) subjected to the pixel discrimination is reversed, is inputted into the D type flip flop 42, and the output 113 of the pixel address counter 8 obtained when the output signal 141 of Q of the D type flip flop 42 has risen from L level to H level that is, the start pixel of the effective image region is accommodated in the latch 11, and the image tip address value 114 at the longitudinal film position is stored in the memory 21.

In the case of the end pixel of the effective image region, the operation is conducted as follows. The signal 106 of the discrimination result of the image portion (0) and the non-image portion (1) subjected to pixel discrimination, is inputted into the D type flip flop 41, and the output 113 of the pixel address counter 8 obtained when the output signal 140 of $\overline{Q}$ of the D type flip flop 41 has risen from L to H, that is, the end pixel of the effective image region is accommodated in the latch 10, and the image tail address value 115 at the longitudinal film position is stored in the memory . 21.

Then, the start and end pixels of the effective image region corresponding to several lines (for example, 10) are found, and the previous line pixels and the found line pixels are compared with each other using the CPU 20. In order to set the region a little inside so that the entire image can be set in the region, in the case of the start pixel, the larger one is made to be a start pixel, and in the case of the end pixel, the smaller one is made to be an end pixel.

II-3-3 Determination of the Final Effective Image Region

It has been conventionally known that: in a photographic printer, the peripheral portion of an image is cut by 0.5 mm so that the entire image can be printed in the frame on a photographic paper. Therefore, also in this example, the lines disposed inside corresponding to 0.5 mm (8 lines) are calculated by the CPU, and thus obtained final effective image region is stored in the memory 21.

The region extracted as the effective image region is compared with an appropriate default value using the CPU. In the case where the difference is large or the effective image region can not be extracted, the default value is stored in the memory 21 as a final effective image region.

III Discrimination between Standard Photographing and Panoramic Photographing

FIG. 13 shows projected images of standard and panoramic photographing. As explained in item II-1 of the method for determining the effective image region of a pseudo panoramic negative film, FIGS. 24 to 27 show profiles in which portion L in FIG. 13 is binarized on the basis of the data discriminated between the image and non-image portions at each pixel. According to FIGS. 24 to 27, the number of pixels of the non-image portion of the image data 1 becomes approximately 0 in the standard photographing in both the longitudinal and lateral film positions. In the case of lateral pseudo panoramic photographing, the number of the lateral film width pixels is N which is the number of pixels of ne primary scanning line, and in the case of longitudinal pseudo panoramic photographing, the number of the lateral film width pixels is N′. Therefore, the number of pixels of image data 1 is different between the standard photographing and the pseudo panoramic photographing. Therefore, when the number of pixels of the image data 1 (non-image portion) is approximately 0, it is made to be the standard photographing, so that the standard photographing and the pseudo panoramic photographing can be discriminated.

Next, with reference to FIG. 12 that is a circuit diagram of the image reading device, a substantial signal flow will be explained as follows.

A portion of the region discriminating circuit is also used for the pseudo panoramic reference judgment.

Portion L in FIG. 13 is subjected to the pseudo panoramic reference judgment in line n. As explained in item II-3-1, the number of pixels is counted by the image discrimination counter 7 at each line. Therefore, the lateral start position signal 134 is sent to the selector 6 form the CPU 20, so that the non-image portion becomes 1 and the image portion becomes 0, and the non-image portion is counted by the image discrimination counter 7. Line n is sent to the comparator 14 as the pseudo panoramic reference discriminating line data 121. Then, line n is compared with the line counter output 116 sent from the line counter 9. When line n becomes the same as the line counter output, the number 112 obtained by the image discriminating counter 7 is sent to the CPU 20 from the interface 19 by the pseudo panoramic reference discriminating line timing signal 122. When this number 112 of the image discriminating counter is, for example, 0, it is judged that the standard photographing is conducted, and when the number 112 is not 0, it is judged that the panoramic photographing is carried out.

IV Method for Removing an Unnecessary Image Portion

A region that has been judged not to be an effective image region by the region discriminating section 436 in FIG. 5, an image signal outputted from the image processing section is forcibly made to be 0 in the case of a negative film, so that the unnecessary image portion can be removed.

In this example, the present invention is applied to a projector type of image reading device. Of course, the same effect can be provided when the present invention is applied to a scanner type of image reading device.

As described above, the present invention is to provide an image reading device, comprising: an image reading means to read image information on a standard photographing negative film and a pseudo panoramic photographing negative film; and a removing means to remove an unnecessary portion from the image information sent from said image reading means, said unnecessary portion being a portion except for a pseudo panoramic photographed portion. Therefore, both the standard photographing film and the pseudo panoramic photographing negative film can be read using a negative film carrier for standard photographing use. Therefore, an operator can read the negative film information without giving consideration to the photographing conditions of pseudo panoramic photographing and standard photographing.

As described above, the image reading device of the present invention comprises: an image reading means to read image information of a standard photographic image and a pseudo panoramic photographic image, both said standard photographic image and said pseudo panoramic photographic image existing on a negative film; a discriminating means to discriminate between standard photographing and pseudo panoramic photographing from the image information sent from the image reading means; and a removing means to remove an unnecessary portion from the discrimination results obtained by said discriminating means, said unnecessary portion being a portion except for a pseudo panoramic photographed portion. Therefore, only when a negative film carrier for standard photographing is used for a film in which both a standard photographed image and a pseudo panoramic photographed image are provided, the pseudo panoramic photographed image can be read. Therefore, an operator can read the negative film information without giving consideration to the photographing conditions of pseudo panoramic photographing and standard photographing.

In the image reading device of the present invention, said removing means is characterized in that: the unnecessary portion except for a pseudo panoramic photographed portion is removed by region discrimination; and in the case where the region discrimination can not be carried out, the unnecessary portion except for a pseudo panoramic photographed portion is removed using a predetermined region. Therefore, even when it is impossible to carry out region discrimination, an operator can read the negative film information without giving consideration to the photographing conditions of pseudo panoramic photographing and standard photographing.

Figure 29:
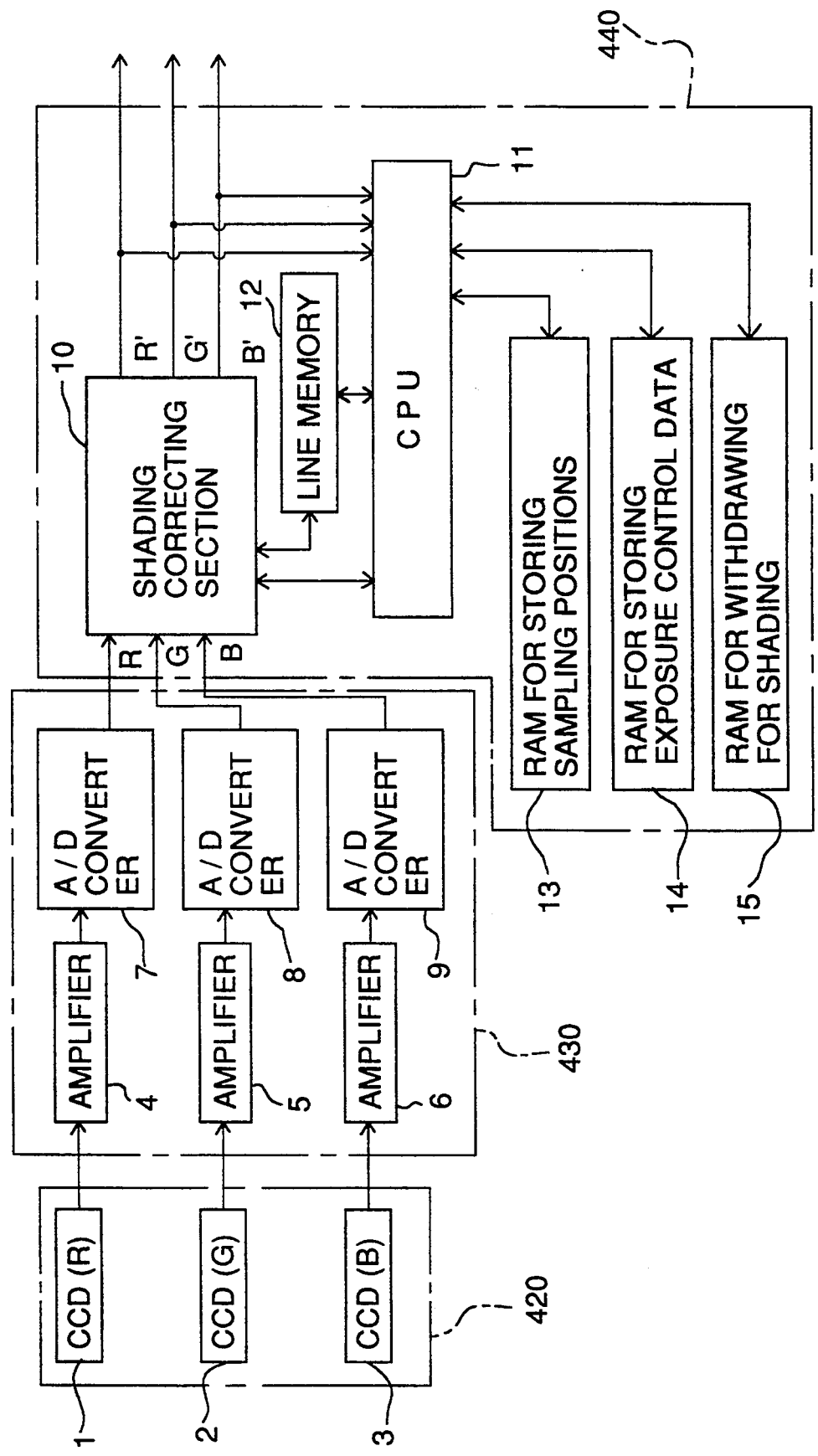
FIG. 29 is a view showing an example of the image processing circuit diagram of the color image reading device to accomplish the second object of the invention.

FIG. 29 shows an example of the image signal processing circuit diagram of the color image reading device illustrated in FIG. 3, and the second object of the invention can be accomplished by this circuit.

Numerals 1 to 3 are CCD line sensors for inputting an image. This CCD line sensor includes an array of CCDs in which a plurality of photoelectric conversion elements are aligned on a line. Image information signals outputted from the CCD line sensors 1 to 3 are amplified by the amplifiers 4 to 6 provided for each color. Then, the signals are converted into digital signals of R, G and B, so that the signals are changed into a line of time series signals for each color. This time series signal is inputted into the shading correcting section 10.

This shading correcting section 10 is controlled by the CPU 11 to which the line memory 12 is connected. This line memory 12 has the following function: in order to correct the dispersion of sensitivity of the CCD line sensors 1 to 3, and also in order to correct the unevenness of the amount of light irradiated by the light source, the shading data of R, G and B of one line of CCD is stored for each pixel, and this line memory 12 is composed of a semiconductor random access memory RAM. In the shading correcting section 10, calculation is conduced between the image signal and the shading data read out from the line memory 12 in accordance with a control signal sent from the CPU 11, so that the correction of fluctuation of the output signal in the primary scanning direction is carried out, and also the correction of white balance of R, G and B is carried out.

The CPU 11 is connected with the sampling position storing RAM 13, the exposure control data storing RAM 14, and the shading data withdrawal RAM 15. The sampling position storing RAM 13 stores sampling positions for the shading data and exposure control data that will be described later. The exposure control data storing RAM 14 stores exposure control data for discriminating the film exposure condition. The shading data withdrawal RAM 15 temporarily withdraws the shading data stored in the line memory 12. The CPU 11 makes access to each of them.

Figure 30:
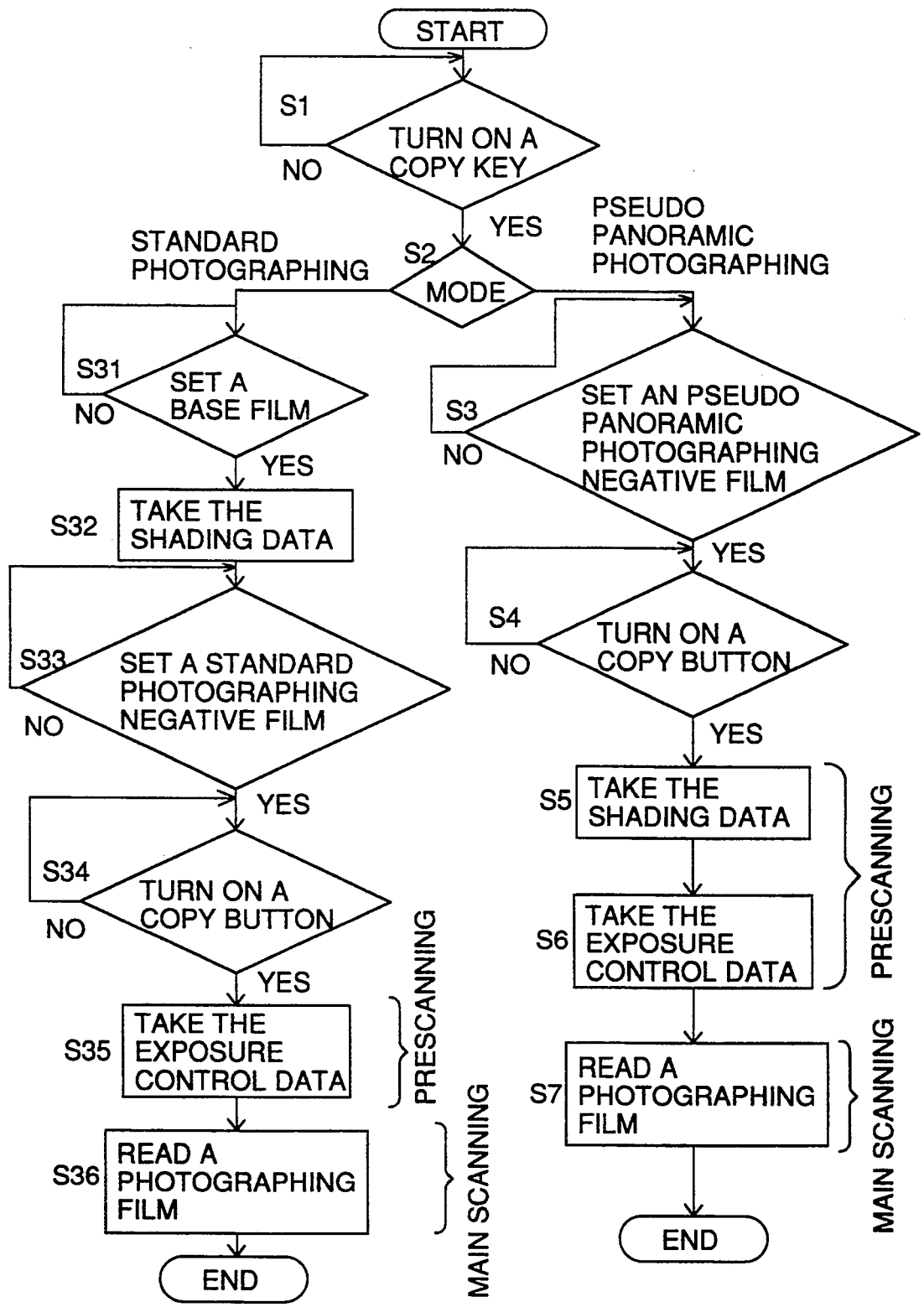
FIG. 30 is a flow chart showing a control procedure.

Next, with reference to FIG. 30, a reading operation of this image reading device will be explained as follows. FIG. 30 is a flow chart showing the control procedure.

Setting of Pseudo Panoramic Photographing Mode and Standard Photographing Mode

First, in step S1, the operation of a copy key is discriminated. In the case where the copy key is in a state of ON, the operations are conducted as follows. Since there are two kinds of negative films, one is a standard photographing negative film F1 shown in FIG. 1, and the other is a pseudo panoramic negative film F2, it is necessary to discriminate the reading mode of standard photographing negative film F1 and that of pseudo panoramic photographing negative film F2 in step S2. Therefore, mode setting is conducted by the key of the device. In this example, the mode setting is conducted when a command is inputted through the key. However, the mode setting may be conducted by discriminating between standard photographing and pseudo panoramic photographing by means of image processing.

Standard Photographing Mode

Figure 28:
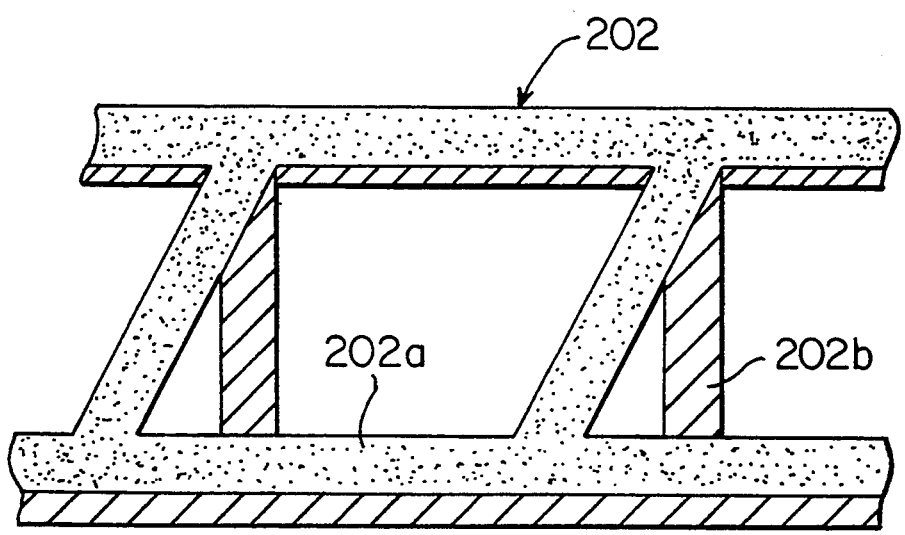
FIG. 28 is a perspective view of a film carrier for negative film use.
Figure 31:
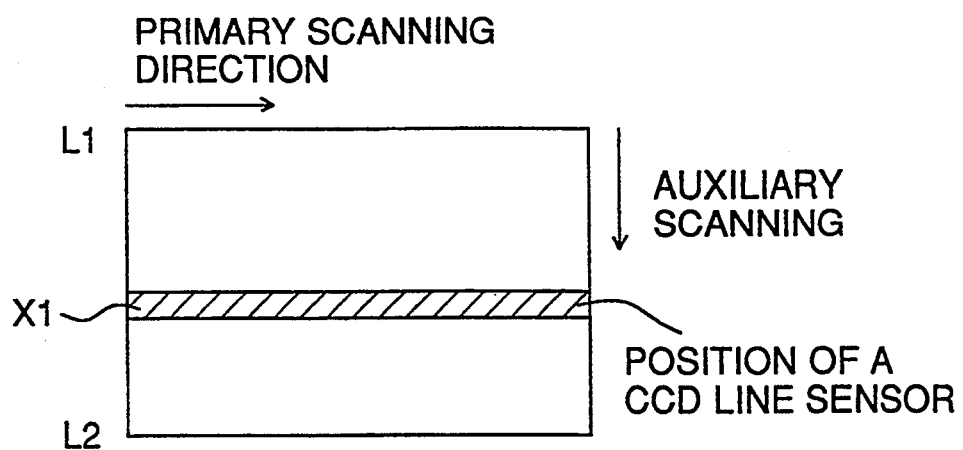
FIG. 31 is a view showing the circumstances of taking shading data of a standard photographing negative film.

Next, when the standard photographing mode is selected in step S2, an unexposed frame of the film base is set in the negative film carrier 202 shown in FIG. 28, and the negative film carrier 202 is inserted from insertion opening of the projector in the same direction as that of the photographing direction of standard photographing negative film F1. It is checked in step S31 that the base film has been set, and then the scanning of shading is started. Positional data X1 disposed close to the center between edge portions L1 and L2 shown in FIG. 31 is sent from the sampling position storing RAM 13 shown in FIG. 29. The sampling of shading data is conducted in step S32 by a sampling signal sent from the CPU 11 on the basis of the aforementioned positional data X1.

Usually, the shading data corrects the distribution of the amount of irradiating light and the dispersion of sensitivity of individual line sensor elements (arrays of photoelectric conversion element). In addition to that, in the case of shading of a negative film, the orange masking of the negative film is corrected, and the shading is conducted using the unexposed portion of the film in order to effectively use the dynamic range, so that the color data corresponding to the orange mask can be removed. In this case, in order to improve the accuracy, a plurality of lines are sampled, and the obtained data is averaged using the CPU 11 so as to find the final shading data. Then, the data is stored in the line memory 12 shown in FIG. 29.

After the scanning of shading has been completed, standard photographing negative film F1 is set in the negative film carrier 202. This negative film carrier 202 is inserted from the insertion opening of the projector, that is, the negative film carrier 202 is inserted in the same direction as that of shading.

It is checked in step S33 that standard photographing negative film F1 has been set. It is discriminated in step S34 whether the copy button is pressed or not. After it has been confirmed that the copy button was pressed, prescanning is started first. In order to appropriately read the projected image, the exposure control data to correct various conditions of a standard photographing negative film is taken in step S35.

Usually, the latitude of a standard photographing negative film is wide, so that it is necessary to print the negative films of various exposure conditions from over-exposure to under-exposure, and the printed conditions must be approximately the same. The exposure condition when the negative film was photographed is not known. Therefore, it is necessary to sample the image density of the negative film so as to adjust the exposure mount to be given to the negative film, so that the exposure control data is taken. For example, the amount of light irradiated by a lamp is varied in accordance with the exposure control data so that the exposure amount given onto the negative film is changed. Accordingly, the amount of light irradiated on the reading element is made equal with respect to negative films of over-exposure and that of under-exposure so as to provide prints in the same condition.

When the sampling operation for image density is conducted in a range as wide as possible, the accuracy of exposure control, that is, the conversion from negative to positive can be improved.

Figure 32:
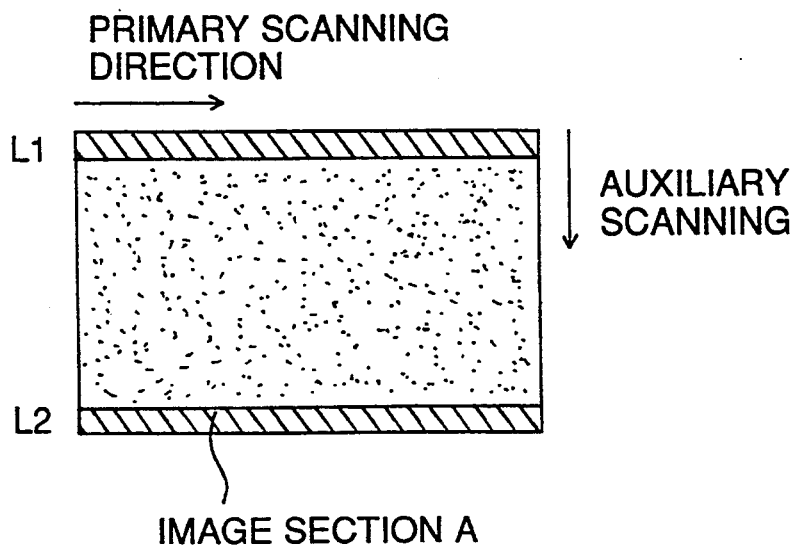
FIG. 32 is a view showing the circumstances of taking exposure control data of a standard photographing negative film.

In the case of standard photographing negative film F1, a sampling operation is started by a sampling signal sent from the CPU 11 in accordance with the positional data of edge portion L1 shown in FIG. 32 sent from the sampling position storing RAM 13 illustrated in FIG. 29, and then the sampling operation is continued to edge portion L2. In this example, sampling of the exposure control data is carried out from edge portion L1 to edge portion L2, however, sampling of the exposure control data may be conducted only on a portion from edge portion L1 to edge portion L2.

Finally, in step S36, image portion A of standard photographing negative film F1 is read with the aforementioned method.

Pseudo Panoramic Photographing Mode

When the pseudo panoramic photographing mode is selected in step S2, pseudo panoramic photographing negative film F2 is set in the negative film carrier 202, and this negative film carrier 202 is inserted from the lateral insertion opening of the projector. It is confirmed in step S3 that pseudo panoramic photographing negative film F2 has been set, and it is discriminated in step S4 whether the copy button has been pressed or not. When it is confirmed that the copy button has been pressed, a prescanning operation is started, and shading data is taken in step S5.

Figure 33:
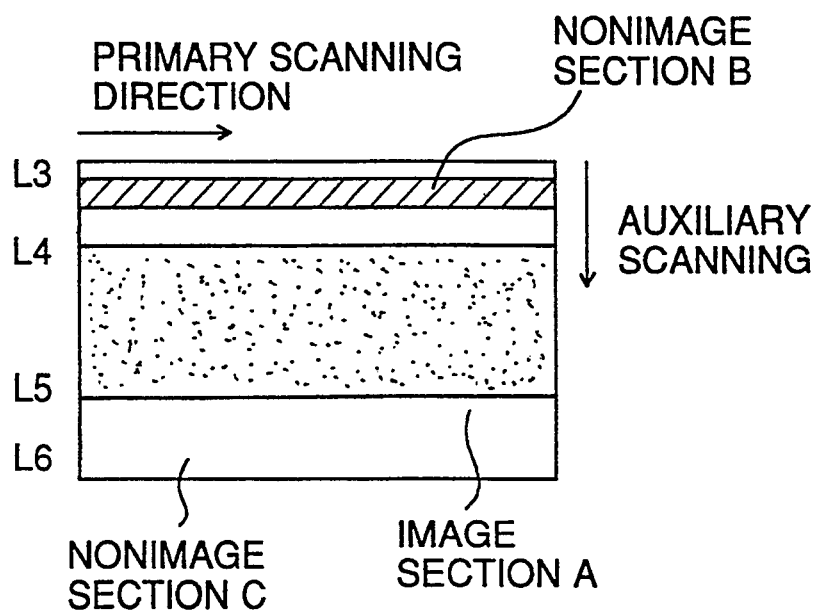
FIG. 33 is a view showing the circumstances of taking shading data of a pseudo panoramic photographing negative film.

Shading is carried out for the reason explained in the paragraph of reading of standard photographing negative film F1. As shown in FIG. 33, in the case of pseudo panoramic photographing negative film F2, shading is carried out using non-image portion B disposed between L3 and L3, and also using non-image portion C disposed between L5 and L6.

Figure 34:
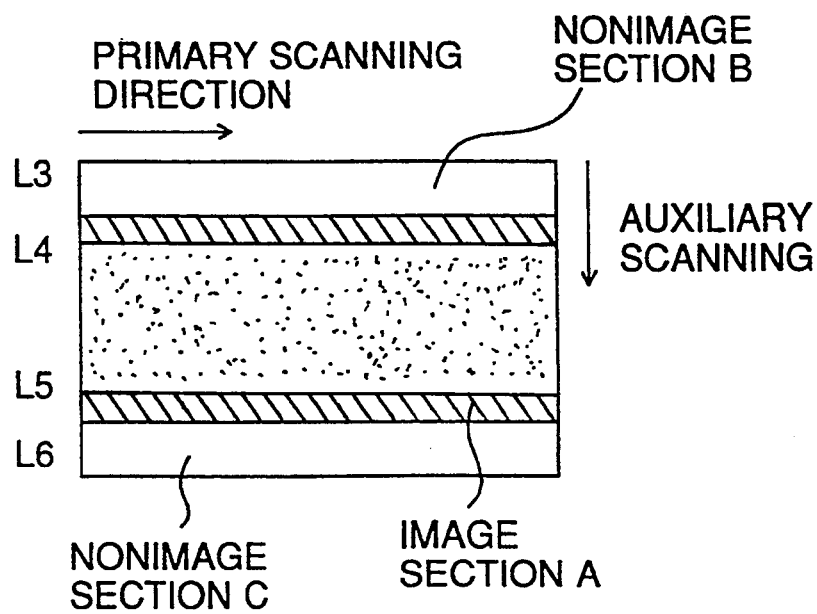
FIG. 34 is a view showing the circumstances of taking exposure control data of a pseudo panoramic photographing negative film.

Next, as explained in the paragraph of reading of standard photographing negative film F1, in order to appropriately read the projected image, exposure control data to correct various conditions of pseudo panoramic photographing negative film F2 is taken in step S6. When the sampling operation for image density on pseudo panoramic photographing negative film F2 is conducted in a range as wide as possible, the accuracy of exposure control can be improved. Therefore, exposure control data is collected in a range from L4 that is the start of image portion A, to L5 that is the end of image portion A as shown in FIG. 34.

For example, prescanning is started, and positional data disposed close to the center between edge portions L3 and L4 shown in FIG. 9 is sent from the sampling position storing RAM 13 shown in FIG. 29. The sampling of shading data is conducted in step S5 by a sampling signal sent from the CPU 11 on the basis of the aforementioned positional data. Next, a sampling-operation of exposure control data is conducted in the CPU 11 in accordance with the positional data between L4 and L5 shown in FIG. 33 sent from the sampling position storing RAM 13, and the exposure control data is stored in the exposure data storing RAM 14 shown in FIG. 29. That is, both shading data and exposure control data are taken in a series of prescanning operation.

In this case, in order to improve the accuracy of sampling of exposure control data, the sampling operation is carried out in a region from L4 to L5, that is, the sampling operation is carried out in the image portion of the pseudo panoramic photographing negative film. However, the sampling operation may be carried out only in a portion from L4 to L5, depending on an image. That is, depending on an image to be read, a sampling position to sample the exposure control data stored in the sampling position storing RAM 13 shown in FIG. 29 may be changed. Finally, image portion A of pseudo panoramic photographing negative film F2 is read in step S7 in accordance with the exposure control data.

As described above, the device of the present invention includes a shading correction means that conducts shading correction using a non-image portion of a pseudo panoramic negative film, in which an image is not photographed. Therefore, in the case where image information of the pseudo panoramic negative film is read and processed, shading correction can be carried out using the non-image portion on the pseudo panoramic negative film, in which an image is not photographed. Accordingly, it is not necessary to prepare an unexposed spare frame, and shading can be carried out in the same exposed frame on the pseudo panoramic negative film. Therefore, when the film is developed, the conditions become the same, and color reproduction can be precisely conducted. Since shading correction is conducted in the same frame on the pseudo panoramic photographing film, the preserving conditions become the same, so that shading correction can be accurately carried out as compared with a case in which an unexposed frame is used for shading correction.

As described above, the device of the present invention includes an exposure control means in which only a photographed image portion on a pseudo panoramic photographing film is used for exposure control data. Therefore, in the case where the image information of the pseudo panoramic photographing film is read and subjected to image processing, only the photographed image portion on the pseudo panoramic photographing film is used for the exposure control data. Since only the exposure control data of the image portion on the pseudo panoramic photographing film is read, exposure control can be precisely conducted, and further negative-positive reversal can be precisely carried out.

The device of the present invention includes a means to take the shading correction data and the exposure control data during a prescanning operation conducted before image information of a pseudo panoramic photographing film is read. Therefore, when image information of the pseudo panoramic photographing film is read and processed, the shading data and exposure control data can be taken while the prescanning operation is being conducted on the pseudo panoramic photographing film. Accordingly, the shading operation can be conducted in one prescanning operation, so that it is not necessary to separately conduct the shading operation. Consequently, an operator can read image information without giving consideration to shading correction. Further, exposure control data can be read only from the photographed image portion. Therefore, exposure control can be precisely conducted, and negative-positive reversal can be accurately carried out.

Figure 35:
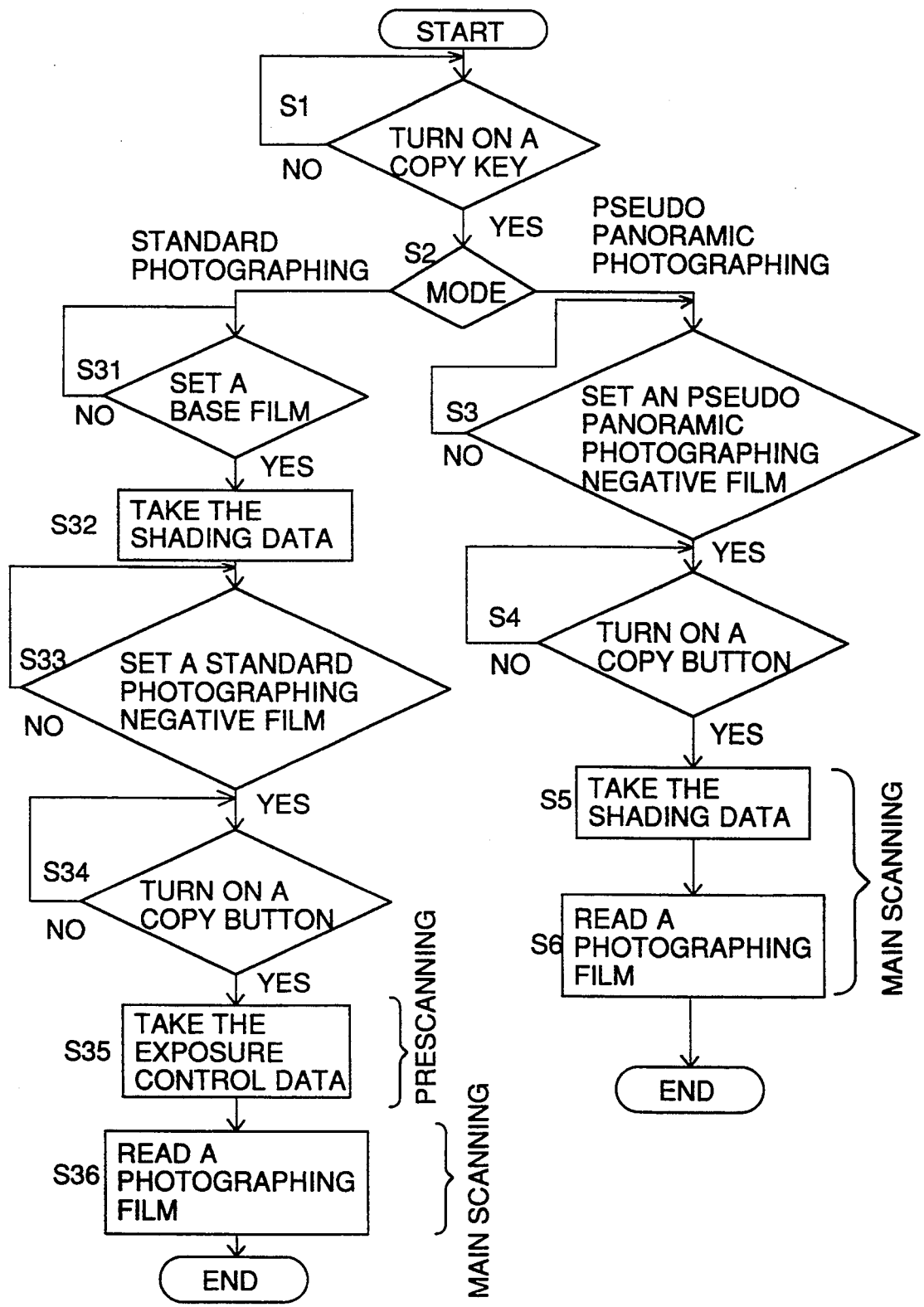
FIG. 35 is a flow chart showing a control procedure to accomplish the third object of the present invention.

FIG. 35 is a flow chart showing a variation of the device illustrated in FIG. 30. Third object of the present invention can be accomplished by this example.

When the pseudo panoramic photographing mode is selected in step S2, pseudo panoramic photographing film F2 is set in the film carrier 202, and this negative film carrier 202 is inserted from the lateral insertion opening of the projector. It is confirmed in step S3 that pseudo panoramic photographing negative film F2 has been set, and it is discriminated in step S4 whether the copy button has been pressed or not. When it is confirmed that the copy button has been pressed, a primary scanning operation is started, and shading data is taken in step S5.

Shading is carried out for the reason explained in the paragraph of reading of standard photographing negative film F1. As shown in FIG. 33, in the case of pseudo panoramic photographing negative film F2, shading is carried out using non-image portion B disposed between L3 and L3, and also using non-image portion C disposed between L5 and L6. For example, prescanning is started, and positional data disposed close to the center between edge portions L3 and L4 shown in FIG. 9 is sent from the sampling position storing RAM 13 shown in FIG. 5. The sampling of shading data is conducted in step S5 by a sampling signal sent from the CPU 11 on the basis of the aforementioned positional data. After the shading correction has been carried out in non-image regions B and C on this pseudo panoramic photographing negative film F2, image region A is read under the same condition (step S6).

That is, the information processing section 400 of this image reading device includes a means that conducts the shading correction in non-image portions B and C on the pseudo panoramic photographing negative film F2, and reads image portion A under the same condition. In a conventional image reading device, after the shading and exposure control has been conducted in a prescanning operation, pseudo panoramic photographing negative film F2 is read in a primary scanning. That is, it is necessary to prescanning and primary scanning operations. However, in the image reading device of the present invention, it is not necessary to conduct exposure control if the exposure conditions-are already known, so that both shading and reading can be carried out by one scanning operation. As a result, the camera performance can be improved, and exposure control can be precisely conducted. Therefore, the exposure condition of a photographed film is appropriate, so that it not necessary to check the exposure condition. Both shading and reading can be carried out by one scanning operation, and accordingly a film reading operation can be simplified.

Also, the information processing section 400 of this image reading device includes a means that conducts image reading in the following manner: when pseudo panoramic photographing negative film F2 is read a plurality of times, in the second image reading operation and after that, the shading data of the first image reading operation is utilized. Also when image reading is conducted a plurality of times by the conventional image reading device, shading and exposure control are conducted in a prescanning operation, and then pseudo panoramic photographing negative film F2 is read. Therefore, the shading operation is conducted a plurality of times in the conventional device. According to the present invention, it is sufficient to conduct the shading operation only once. Therefore, the image reading operation can be simplified.

Also, the information processing section 400 of this image reading device includes a means that conducts image reading in the following manner: when pseudo panoramic photographing negative film F2 is read a plurality of times, the shading data of the first image reading operation is utilized in the second image reading operation and after that. According to the conventional image reading device, in the case where the same frame is read a plurality of times, the circumstances of pseudo panoramic photographing negative film F2 are checked each time. However, since the frame is the same, the conditions of shading and exposure are not changed. Therefore, when the second operation and after that can be conducted using the data of the first operation. In this way, the reading operation can be simplified.

Also, the information processing section 400 of this image reading device includes a means that conducts image reading in the following manner: when pseudo panoramic photographing negative film F2 is read a plurality of times, shading data is collected once in a plurality times. Therefore, image quality can be maintained by the minimum correcting operation. The minimum correcting operation is as follows: when pseudo panoramic photographing negative film F2 is read a plurality of times, shading correction data is collected once in a plurality of times, and the new shading correction data is stored in the memory for the successive shading correction.

Figure 36:
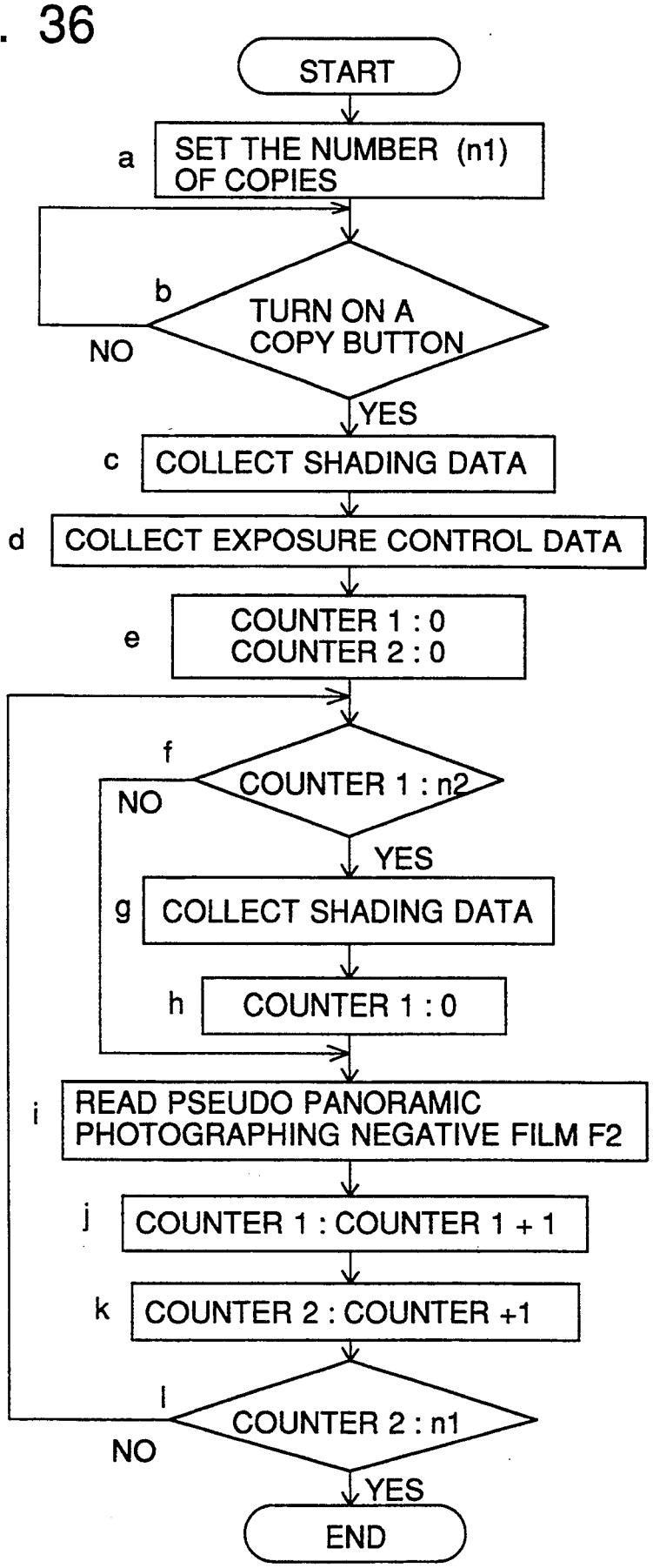
FIG. 36 is a flow chart in the case where shading data is collected once in a plurality of times when a pseudo panoramic photographing negative film is read a plurality of times.

FIG. 36 shows a flow chart of this image reading operation. In step a, the number of copies is set. In this example, the number is determined to be n1. Next, in step b, it is judged whether the copy button is turned on or not. In the case of ON, the program advances to step c. In step c, shading data is collected, and in step d, exposure control data is collected. Next, in step e, shading is conducted with the counter 2 that counts the number of copies. After that, the counters 1 and 2 that count the number of copies are respectively set at 0. After shading has been conducted in step f, the counted number of the counter 1 is compared with n2 that has been previously set. In the case where the counted number of the counter 1 is n2, the program advances to step g, and shading data is collected. Then, the counter 1 is set at 0 in step h. In the case where the counted number of the counter 1 is n2, or after step h, the program advances to step i, and pseudo panoramic photographing negative film F2 is read. Then, in step j, the counted number of the counter 1 is increased by 1, and in step k, the counted number of the counter 2 is increased by 1. Finally, in step l, the counted number of the counter 2 is compared with n1 that was set in step a. In the case where the counted number of the counter 2 is not n1, the program advances to step f, and in the case where the counted number of the counter 2 is n1, the copy operation is completed.

As described above, each time the copy operation is conducted n2 times, the shading correction is conducted once.

As described above, after the shading correction has been conducted in the non-image portion of a pseudo panoramic photographing negative film, the image portion is read under the same condition. Therefore, it is not necessary to conduct exposure control if the exposure conditions are already known, so that both shading and reading can be carried out by one scanning operation. As a result, the reading operation can be simplified.

This image reading device includes a means that conducts image reading in the following manner; when a pseudo panoramic photographing negative film is read a plurality of times, the shading data of the first image reading operation is utilized in the second image reading operation and after that. Also when image reading is conducted a plurality of times by the conventional image reading device, shading and exposure control are conducted in a prescanning operation, and then the pseudo panoramic photographing negative film is read. Therefore, the shading operation is conducted a plurality of times in the conventional device. According to the present invention, it is sufficient to conduct the shading operation only once. Therefore, the image reading operation can be simplified.

In the case where the same frame of a pseudo panoramic photographing film is read a plurality of times, in the second time and after that, the shading data or exposure control data of the first time is used for reading, or the shading data and exposure control data of the first time are used for reading. Since the frame is the same, the shading and exposure conditions are not changed. Therefore, when the data of the first time is used in the second time and after that, the reading operation can be simplified.

When a pseudo panoramic photographing negative film is read a plurality of times, the shading data is collected once in a plurality of times. Therefore, image quality can be maintained by the minimum correcting operation.

With reference to the attached drawings, an example to accomplish the fourth object of the present invention will be explained as follows.

Figure 37:
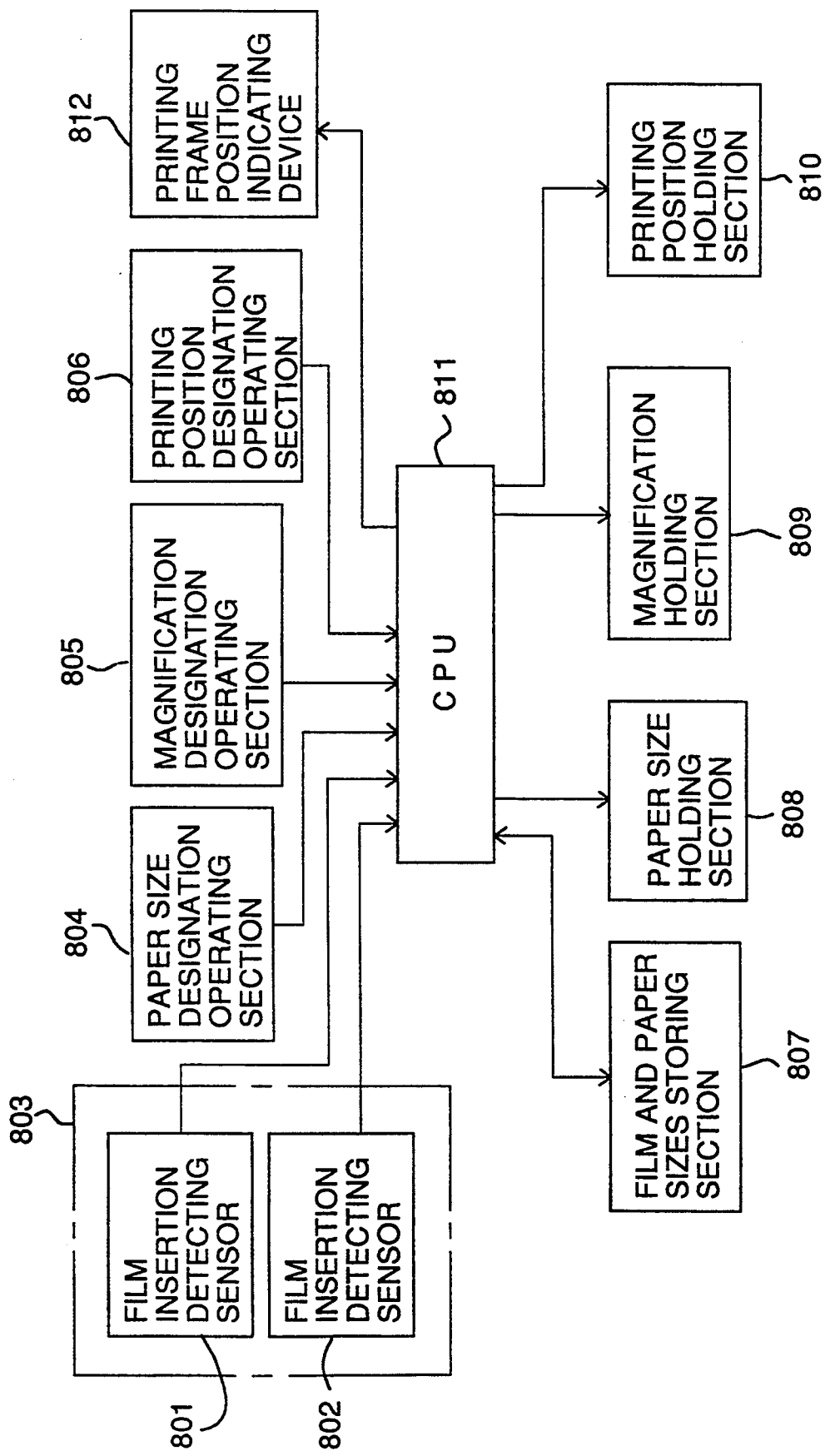
FIG. 37 is a schematic illustration showing showing an example of the image reading device relating to the present invention.

FIG. 37 is a schematic illustration showing the structure of an image reading device for pseudo panoramic films according to the present invention.

Figure 38:
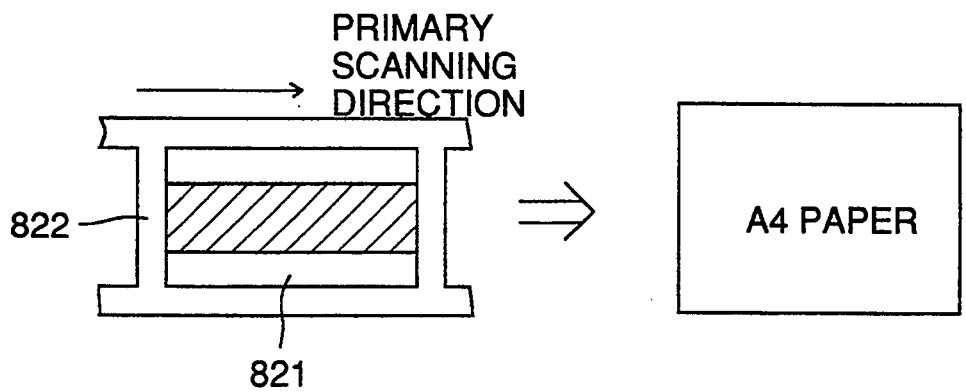
FIGS. 38a and 38b are views showing a relation between the film carrier inserting direction and the predetermined paper in this example.
Figure 38:
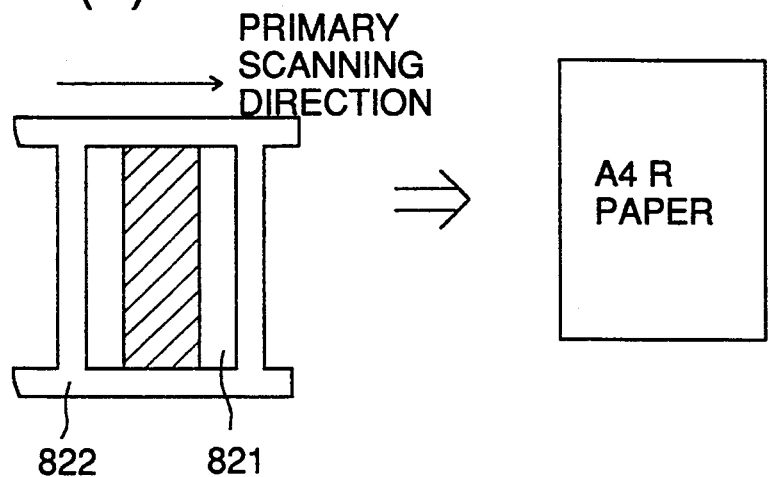

FIG. FIG. 37, the film insertion detecting sensors 801, 802 are provided in the projector 803. As shown in FIG. 38(a), the film insertion detecting sensors 801 detects that the film carrier 822 is inserted in a direction so that the longitudinal direction of the pseudo panoramic film 821 can coincide with the primary scanning direction. As shown in FIG. 38(b), the film insertion detecting sensors 802 detects that the film carrier. 822 is inserted in a direction so that the lateral direction of the pseudo panoramic film 821 can coincide with the primary scanning direction.

The paper size designation operating section 804 selects between an automatic mode and a manual mode. In the automatic mode, A4 papers (the lateral side is long) or A4R papers (the longitudinal side is long) are selected in accordance with the inserting direction of the film carrier 822, which will be described later. In the manual mode, papers of an arbitrary size are selected. In this example, papers of A4 size are used, however, papers of other sizes may be used.

The magnification designating operating section 805 selects between an automatic mode and a manual mode. As described later, in the automatic mode, the magnification is calculated and set in accordance with the inserting direction of the film carrier 822 by a predetermined equation. In the manual mode, an arbitrary magnification can be inputted.

The printing position designating operating section 806 selects between a centering mode by which printing can be conducted in the center of the paper and a frame designation mode by which a plurality of prints can be conducted on a paper.

The film and paper size memory 807 previously stores the sizes of various films that can be read, and also stores the sizes of papers that can be used. The paper size holding section 808, the magnification holding section 809 and the printing position holding section 810 are composed of a RAM. The paper size, the printing magnification, and the designated printing position such as centering are respectively stored the RAMS.

According to the outputs of the film insertion sensors 801, 802, the paper size designation operating section 804, the magnification designating operating section 805 and the printing position designating operating section 806, and further according to the stored data of the film and paper size memory 808, the paper size, the print magnification and the printing position are respectively determined by the CPU 11, and the determined data are stored in the paper size holding section 808, the magnification holding section 809 and the printing position holding section 810. When the frame designation mode is selected by the printing position designation operating section 806, the number of images to be printed on a paper and the position of a frame on the paper are indicated by the printing frame number indicator 812. In this case, the CPU 11 includes the functions of: a paper determination means to determine the paper in accordance with the inserting direction of the film carrier 822; a printing magnification determining means; a printing position control means; a calculation means to calculate the number of panoramic images that can be printed on the paper, in accordance with the designated paper size; and a designation means to designate the printing position of an image when the calculated number of images is plural.

Next, the operation of the image reading device of this example will be explained as follows.

First, a case in which the paper size and magnification are automatically designated, will be explained as follows.

For example, in the case where the film carrier 22 is inserted in a lateral direction as shown in FIG. 38a, the film insertion sensor 1 detects the film carrier 22, and an ON signal is inputted into the CPU 11. Then, the paper size of A4 is selected by the CPU 11, and the selected paper size A4 is temporarily stored in the paper size holding section 808.

The CPU 11 reads the length of the lateral direction of the inserted pseudo panoramic film (the longitudinal direction of the film), and the length of the lateral direction of the selected A4 paper from the paper size storing section 807, and then magnification Z is calculated by the following equation (1).

$$Z = (\text{lateral length of paper})/(\text{lateral length of projected image on film}) \quad (1)$$

The result of calculation is temporarily stored in the magnification holding section 809.

In the case where the paper size and magnification are automatically designated, the number of images printed on a paper is 1, and the centering mode is designated by the printing position designating operation section 806, and then the image is printed in the center of the paper.

Figure 39:
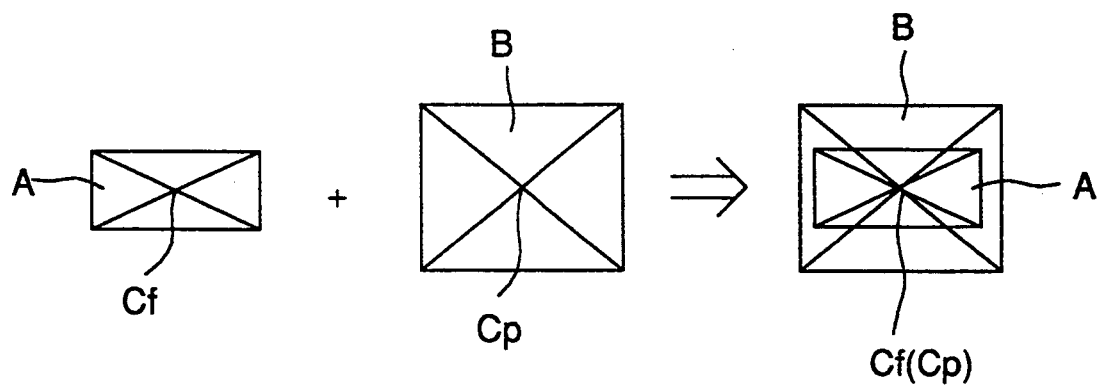
FIG. 39 is a schematic illustration for explaining a centering mode to designate a print position of this example.

This centering operation is carried out in the following manner: as shown in FIG. 39, the CPU 11 calculates the image position so that center Cf of film image A can be superimposed on center Cf of paper B. Then, the determined printing position is temporarily stored in the printing position holding section 810.

Next, in the case where the film carrier 822 is inserted in the longitudinal direction as shown in FIG. 38b, the film insertion detecting sensor 802 detects the film carrier 822, and an ON signal is inputted into the CPU 11. Then, paper size A4R is selected by the CPU 11, and this selected paper size A4R is temporarily stored in the paper size holding section 808.

The CPU 11 reads the length of the longitudinal direction of the inserted pseudo panoramic film (the longitudinal direction of the film), and the length of the longitudinal direction of the selected A4 paper from the paper size storing section 807, and then magnification Z is calculated by the following equation (2).

$$Z = (\text{longitudinal length of paper})/(\text{longitudinal length of projected image on film}) \quad (2)$$

The result of calculation is temporarily stored in the magnification holding section 809.

Then, the centering mode is designated by the printing position designating section 806 so that the printing position is determined in the same manner as described above, and the determined printing position is temporarily stored in the printing position holding section 810.

According to the paper size, magnification and printing position determined in the aforementioned manner, a projected image of the pseudo panoramic film is printed on the paper.

In the case where the paper size and magnification are manually designated, irrespective of the output of the film insertion detecting sensor 812, the designated paper and magnification are selected by the paper size designation operating section 804 and the magnification designation operating section 805, and they are stored in the holding sections 808, 809. In the case where the image overflows the paper when the magnification has been manually designated, a warning is previously given.

For example, in the case where the film carrier 822 is laterally inserted as shown in FIG. 38a and the paper size is manually designated to be A4R, the panoramic image is extremely long in the lateral direction, so that a plurality of panoramic image can be printed on one A4R paper at the magnification in which the panoramic image is can be set on the paper.

Figure 40:
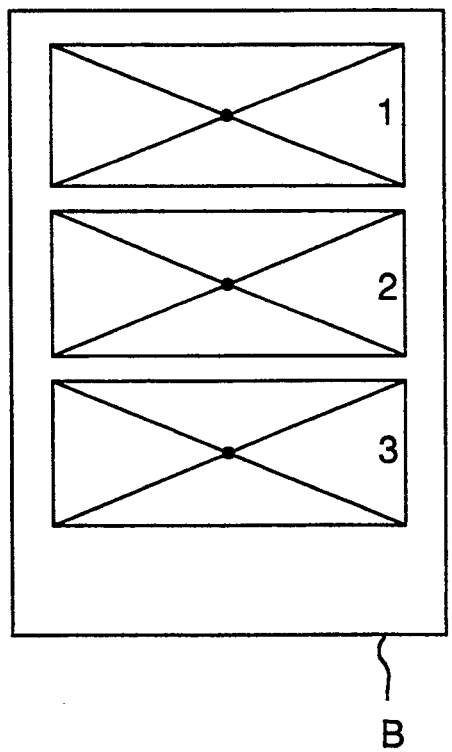
FIG. 40 is a schematic illustration for explaining a frame designating mode in the print position designation of this example.

When the frame designation mode is selected by the printing position designation operating section 806 in this case, the CPU 11 calculates the number of panoramic images that can be printed on the paper, the size of which has been designated. For example, in the case where 3 frames can be printed on the paper, the result of the calculation is displayed on the printing frame position display device 812 as shown in FIG. 40. Then, the printing position designating operating section 806 designates a frame among the frames 1, 2 and 3 displayed on the printing frame position display 12, in which the presently projected panoramic image is to be printed. Then, the designated position is temporarily stored in the printing position holding section 810. For example, in the case where the frame 3 is designated, the image is printed in the lowermost third frame on paper B shown in FIG. 4.

As a result of the foregoing, a plurality of sheets of panoramic images can be printed on one sheet of paper. Therefore, papers can be economized.

The projection type of image reading device is applied to this example. Of course, when the present invention is applied to a scanner type of image reading device, the same effects can be provided.

As explained above, the present invention can provide an image reading device suitable for reading an image on a panoramic film, the lateral size of which is extremely long compared with a standard size film.

Also, a plurality of sheets of images can be printed on one paper, so that panoramic images can be effectively printed without wasting papers. Therefore, waste of papers can be avoided.

What is claimed is:

1. An apparatus for reading a photographed image on a standard size film, wherein the photographed image is exposed n a photographing frame on the film so that the film has an exposed region on the frame and an unexposed region, and the image exposed on the frame can be formed as a standard size image or a pseudo panoramic image so that the film has an unexposed region in the exposed frame in which the pseudo panoramic image is formed, the apparatus comprising:

reading means for scanning and reading an image on the film and for outputting a density signal representing a density level of the image on the film;

control means for controlling the scanning position of the reading means so that the reading means is controlled to scan the unexposed region on the film in addition to the exposed region;

shading means for receiving density signals obtained from the unexposed region, for generating shading data on the basis of the density signals of the unexposed region, wherein the shading data is used to correct shading caused by uneven sensitivity of the reading means, and for conducting shading correction on the density signal of the unexposed region by the shading data;

processing means for determining a threshold value on the basis of the corrected density signal of the unexposed region so that the threshold value is determined to be lower than the signal level of the corrected density signal of the unexposed region and higher than the signal level of the minimum density of the exposed region;

discriminating means for receiving density signals obtained from both the exposed region and the unexposed region in the frame in which a psuedo panoramic image is formed, wherein the density signals are applied with the shading correction by the shading means, the discriminating means for comparing the signal levels of the density signals with the threshold value, and for discriminating the unexposed region from the exposed region from the comparison results; and eliminating means for eliminating the density signals of the unexposed region from the density signals of the frame having the pseudo panoramic image.

2. The apparatus of claim 1, wherein the control means includes a memory to store the position of the unexposed region in the frame in which a pseudo panoramic image is formed, and the reading means includes means for scanning along the stored position on the frame so as to obtain density data of the unexposed region in the frame.

3. The apparatus of claim 1, wherein the eliminating means eliminates image signals corresponding to a predetermined region.

4. The apparatus of claim 1, wherein the reading means comprises a lighting means to project the image on the film and controls the light emitted from the lighting means on the basis of image signals sampled from the image region.

5. The apparatus of claim 4, wherein the reading means comprises means for scanning the projected image.

6. The apparatus of claim 5, wherein the scanning means carries out a preliminary scanning to obtain image signals used for the shading correction and the lighting control and a scanning to output image signals.

7. The apparatus of claim 4, wherein, when the reading means reads the pseudo panoramic image, the reading means obtains image signals used for the shading correction when the scanning means scans the non-image region and outputs image signals when the scanning means scans the image region.

8. The apparatus of claim 7, wherein, when the reading means reads a plurality of the pseudo panoramic images sequentially, the shading means applies the shading correction to image signals of the later pseudo panoramic images on the basis of image signals obtained from the former pseudo panoramic image.

9. The apparatus of claim 7, wherein, when the reading means reads a pseudo panoramic images plural times, the shading means applies the shading correction to image signals of a consecutively scanned image on the basis of image signals of a previously scanned image.

* * * * *

UNITED STATES PATENT AND TRADEMARK OFFICE
CERTIFICATE OF CORRECTION

PATENT NO. : 5,337,164
DATED : August 09, 1994
INVENTOR(S) : Takashi YABE et al.

It is certified that error appears in the above-indentified patent and that said Letters Patent is hereby corrected as shown below:

Claim 1, column 27, line 19, change "n" to --on--.

Signed and Sealed this

Twenty-eight Day of March, 1995

Attest:

BRUCE LEHMAN

*Attesting Officer*     *Commissioner of Patents and Trademarks*